US011528322B1

(12) United States Patent
Chaudhary et al.

(10) Patent No.: US 11,528,322 B1
(45) Date of Patent: Dec. 13, 2022

(54) CONSISTENT DISTRIBUTION USING JUMP TABLE ASSISTED HYBRID HASH

(71) Applicant: Citrix Systems, Inc., Fort Lauderdale, FL (US)

(72) Inventors: Aman Chaudhary, Bangalore (IN); Raghav Somanahalli Narayana, Bangalore (IN); Arunkanth Abbigari, Bangalore (IN); Rajesh Joshi, Bangalore (IN); Vemula Srimithra, Bangalore (IN); Vinay Shivananda, Bangalore (IN)

(73) Assignee: Citrix Systems, Inc., Fort Lauderdale, FL (US)

(*) Notice: Subject to any disclaimer, the term of this patent is extended or adjusted under 35 U.S.C. 154(b) by 0 days.

(21) Appl. No.: 17/407,861

(22) Filed: Aug. 20, 2021

(51) Int. Cl.
*G06F 15/173* (2006.01)
*H04L 67/1008* (2022.01)
*H04L 67/1023* (2022.01)
*H04L 67/101* (2022.01)
*H04L 67/1014* (2022.01)

(52) U.S. Cl.
CPC ........ *H04L 67/1008* (2013.01); *H04L 67/101* (2013.01); *H04L 67/1014* (2013.01); *H04L 67/1023* (2013.01)

(58) Field of Classification Search
CPC . H04L 67/01; H04L 67/1008; H04L 67/1014; H04L 67/1023
See application file for complete search history.

(56) References Cited

U.S. PATENT DOCUMENTS

| 7,321,926 B1* | 1/2008 | Zhang | H04L 67/1017 718/104 |
| 8,077,622 B2* | 12/2011 | Kondamuru | H04L 67/1001 370/252 |
| 2002/0133532 A1* | 9/2002 | Hossain | H04L 67/1023 718/105 |
| 2014/0195686 A1* | 7/2014 | Yeager | H04L 67/289 709/226 |
| 2015/0234873 A1* | 8/2015 | Laurenzo | G01C 21/3881 707/743 |

* cited by examiner

*Primary Examiner* — Johnny B Aguiar
(74) *Attorney, Agent, or Firm* — Foley & Lardner LLP

(57) ABSTRACT

Improving load distribution and consistency is provided. A device intermediary to clients and servers can maintain bit values indicative of server availability stored in indices arranged in various levels. A lowest level comprises indices corresponding to a list of servers repeated multiple times. Each index in a higher level maps to a set of indices in a lower level. The device can receive a request from a client to access a server. The device can identify an index in a highest level. The device can determine a second index in the highest level that is after the index in the highest level and has a bit value indicating server availability. The device can identify an index in the lowest level mapping to the second index in the highest level. The device can select a server corresponding to the index in the lowest level.

20 Claims, 6 Drawing Sheets

CONSISTENT DISTRIBUTION USING JUMP TABLE ASSISTED HYBRID HASH

FIELD OF THE DISCLOSURE

This application generally relates to data communication networks, including but not limited to systems and methods for balancing loads across servers or remote entities.

BACKGROUND

A client device can initiate a request to transmit data or obtain resources to or from one or more remote servers. To establish a communication channel or a path with at least one of the servers, a load balancer can receive the request from the client device and direct the request to an available server. The load balancer can direct traffics from the client device to the server for handling the requests from the client. The load balancer can forward other requests from one or more client devices for one or more available servers to handle the requests.

BRIEF SUMMARY

Client devices can transmit requests to an application delivery controller ("ADC") for distributing traffic or requests across different remote servers or remote devices within a computing environment. With the advent of cloud-native technologies, the ADC should adapt to the increase in dynamic application workloads as servers automatically scale to adjust the amount of computational resources allocated to process the traffic or requests in a server farm. The servers in the computing environment can be deployed using a stateless mesh architecture, which can achieve 99.9999% reliability, for example. The ADC can use a consistent hash algorithm as a method for distributing traffic to the servers deployed with stateless architectures. The ADC can use the consistent hash algorithm to achieve both fault tolerance and uniform load distribution. Fault tolerance can refer to the ability of the ADC to handle node or network failures by redirecting traffic or requests to other available servers. However, it can be challenging to utilize the consistent hash algorithm (e.g., existing open-source consistent hashing algorithms) while accommodating certain features, or without sacrificing certain features. For example, it can be challenging for the consistent hashing algorithm to account for uniform load distribution, consistency during failures, resource consumption, or algorithmic performance to perform a lookup for an available server. Further, some algorithms may be unavailable as open-source algorithms for the ADC to distribute loads across different servers.

The systems and methods of this technical solution can use a jump table-assisted hybrid hash algorithm for consistent load distribution across one or more servers. An ADC or other distributed system for consistent stateless decision-making (e.g., distributed database, key-value storage, distributed memory-caching system ("MemCached"), etc.) can use the hybrid hash algorithm to facilitate or advance towards a stateless architecture. The ADC or other distributed system can include or be a device using the hybrid hash algorithm for distributing loads across servers. The hybrid hash algorithm can provide the necessary consistency and load distribution with reduced impact on the computing processing unit ("CPU") by being stateless.

Further, the device can use the hybrid hash algorithm to perform a lookup for available servers with $O(\log_m N)$ performance. The m can denote the size of each word (e.g., collection or combination of bits). The N can denote the size of a hash table including indices listing the servers. The device can use the hybrid hash algorithm to construct a bit map having $\log_m N$ number of levels to improve lookup time. The device can construct the bit map based on at least the hash table having size N. The hash table can include indices listing one or more servers available to serve a request. The individual bits or words from each level within the bit map can be associated with one or more servers indicating whether the one or more servers are available. The lookup time can reflect the number of levels within the bit map.

The device or other devices (e.g., ADCs or distributed systems) can use the constructed bit map (sometimes referred to as a table) to select and distribute traffic received from client devices across servers using the hybrid hash algorithm. For example, the device can use a portion of the request to determine or calculate a client hash value. The device can map the client hash value to one of the indices of the hash table. With the mapped index, the device can iteratively map the index to one or more other indices at the higher level in the bit map until the highest level (e.g., the last level within the bit map). The device can go through the table to find a non-zero entry at the highest level. The device can identify a set bit position, which can lead to an index at a lower level. The device can iterate the process to determine an index at the lowest level (e.g., the hash table with indices listing the servers).

The device can select the backend server at the index of the lowest level to establish a session and serve requests from a respective client. With the selected server or backend service, the device can forward subsequent requests from the client to the same server. Hence, the device can ensure that the load is distributed among other servers and consistency is maintained using the hybrid hash algorithm to construct a table (e.g., bit map) and perform the lookup for one or more servers to handle client requests. Further, the device can reduce resource consumption by not having to re-generate a lookup table. Instead, the device can update the bits or words of the bit map based on the availability of the servers. Thus, by leveraging a hybrid hash algorithm to distribute traffic from clients to servers, the systems and methods described herein can at least improve the uniformity of load distribution across backend servers or services, improve consistency during network failures, minimize lookup time or the time to take a load balancing ("LB") decision, improve CPU performance to a constant time of $O(\log_m N)$, and reduce resource consumption, such as from not having to regenerate the bit map or hash table when a server goes down.

In one aspect, this disclosure is directed to a method for improving load distribution and consistency. The method can include maintaining, by a device intermediary to a plurality of clients and a plurality of servers, bit values indicative of server availability stored in indices arranged in a plurality of levels. A lowest level of the plurality of levels can include a plurality of indices corresponding to a list of servers repeated multiple times, and each index in a higher level in the plurality of levels can map to a set of indices in a lower level of the plurality of levels. The method can include receiving, by the device, a request from a client of the plurality of clients to access one of the plurality of servers. The method can include identifying, by the device based on at least a portion of the request, an index of a plurality of indices in a highest level of the plurality of levels. The method can include determining, by the device, a second index in the plurality of indices in the highest level that is subsequent to the index in the highest level and has a bit value that indicates one or more servers associated with the second index is available to service the request. The method can include identifying, by the device, an index of the plurality of indices in the lowest level of the plurality of levels that maps to the second index in the highest level. The method can include selecting, by the device to service the request, a server from the list of servers corresponding to the index in the lowest level.

In some implementations, the method can include determining, by the device based on at least the portion of the request, a second index of the plurality of indices in the lowest level. The method can include identifying, by the device, the index of the plurality of indices in the highest level of the plurality of levels that maps to the second index in the lowest level. In some implementations, the method can include determining, by the device, a hash value based on the at least the portion of the request received from the client. The method can include identifying, by the device using the hash value, a second index of the plurality of indices in the lowest level. The method can include iteratively mapping, by the device, the second index in the lowest level to the index in the highest level of the plurality of indices in the highest level.

In some implementations, the method can include iteratively mapping, by the device, the second index from the highest level to the index of the plurality of indices in the lowest level with the bit value that indicates the one or more servers are available. In some implementations, the method can include identifying, by the device, a least significant bit of the second index in the plurality of indices in the highest level, the least significant bit having the bit value that indicates the one or more servers are available. The method can include mapping, by the device, the least significant bit to the index of the plurality of indices in the lowest level. The method can include identifying, by the device, a second least significant bit of the index in the plurality of indices in the lowest level, the second least significant bit having the bit value indicative of an available server. The method can include selecting, by the device to service the request, the server from the list of servers corresponding to the second least significant bit of the index in the lowest level.

In some implementations, the method can include generating, by the device, a hash table with a plurality of indices that each correspond to lists of servers formed from multiple hashes of each of the plurality of servers. The indices of the lowest level of the plurality of levels can correspond to the plurality of indices in the hash table. In some implementations, the method can include setting, by the device, bit values of first indices in the plurality of levels to a non-zero value based on at least one server associated with the indices being ready to service requests from the plurality of clients. The method can include setting, by the device, bit values of second indices in the plurality of levels to zero based on none of the servers associated with the second indices being ready to service requests from the plurality of clients.

In some implementations, the method can include identifying, by the device, the second index in the highest level by proceeding in a circular clockwise direction from the index in the highest level identified based on at least a portion of the request from the client. In some implementations, the method can include updating, by the device, the bit values stored in the indices in the plurality of levels responsive to a change in availability of any server of the plurality of servers.

In another aspect, this disclosure is directed to a system for improving load distribution and consistency. The system can include a device comprising one or more processors and memory. The device can be intermediary to a plurality of clients and a plurality of servers. The device can maintain bit values indicative of server availability stored in indices arranged in a plurality of levels. A lowest level of the plurality of levels can include a plurality of indices corresponding to a list of servers repeated multiple times, and each index in a higher level in the plurality of levels can map to a set of indices in a lower level of the plurality of levels. The device can receive a request from a client of the plurality of clients to access one of the plurality of servers. The device can identify, based on at least a portion of the request, an index of a plurality of indices in a highest level of the plurality of levels. The device can determine a second index in the plurality of indices in the highest level that is subsequent to the index in the highest level and has a bit value that indicates one or more servers associated with the second index is available to service the request. The device can identify an index of the plurality of indices in the lowest level of the plurality of levels that maps to the second index in the highest level. The device can select, to service the request, a server from the list of servers corresponding to the index in the lowest level.

In some implementations, the device can determine, based on at least the portion of the request, a second index of the plurality of indices in the lowest level. The device can identify the index of the plurality of indices in the highest level of the plurality of levels that maps to the second index in the lowest level. In some implementations, the device can determine a hash value based on the at least the portion of the request received from the client. The device can identify, using the hash value, a second index of the plurality of indices in the lowest level. The device can iteratively map the second index in the lowest level to the index in the highest level of the plurality of indices in the highest level.

In some implementations, the device can iteratively map the second index from the highest level to the index of the plurality of indices in the lowest level with the bit value that indicates the one or more servers are available. In some implementations, the device can identify a least significant bit of the second index in the plurality of indices in the highest level, the least significant bit having the bit value that indicates the one or more servers are available. The device can map the least significant bit to the index of the plurality of indices in the lowest level. The device can identify a second least significant bit of the index in the plurality of indices in the lowest level, the second least significant bit having the bit value indicative of an available server. The device can select, to service the request, the server from the list of servers corresponding to the second least significant bit of the index in the lowest level.

In some implementations, the device can generate a hash table with a plurality of indices that each correspond to lists of servers formed from multiple hashes of each of the plurality of servers. The indices of the lowest level of the plurality of levels can correspond to the plurality of indices in the hash table. In some implementations, the device can set bit values of first indices in the plurality of levels to a non-zero value based on at least one server associated with the indices being ready to service requests from the plurality of clients. The device can set bit values of second indices in the plurality of levels to zero based on none of the servers associated with the second indices being ready to service requests from the plurality of clients. In some implementations, the device can identify the second index in the highest level by proceeding in a circular clockwise direction from the index in the highest level identified based on at least the portion of the request from the client.

In yet another aspect, this disclosure is directed to a non-transitory computer readable medium storing instructions. The instructions, which when executed by one or more processors, can cause the one or more processors to maintain bit values indicative of server availability stored in indices arranged in a plurality of levels. A lowest level of the plurality of levels can include a plurality of indices corresponding to a list of servers repeated multiple times, and each index in a higher level in the plurality of levels can map to a set of indices in a lower level of the plurality of levels. The non-transitory computer readable medium can receive request from a client to access one of a plurality of servers. The non-transitory computer readable medium can identify, based on at least a portion of the request, an index of a plurality of indices in a highest level of the plurality of levels. The non-transitory computer readable medium can determine a second index in the plurality of indices in the highest level that is subsequent to the index in the highest level and has a bit value that indicates one or more servers associated with the second index is available to service the request. The non-transitory computer readable medium can identify an index of the plurality of indices in the lowest level of the plurality of levels that maps to the second index in the highest level. The non-transitory computer readable medium can select, to service the request, a server from the list of servers corresponding to the index in the lowest level.

In some implementations, the non-transitory computer readable medium can determine, based on at least the portion of the request, a second index of the plurality of indices in the lowest level. The non-transitory computer readable medium can identify the index of a plurality of indices in the highest level of the plurality of levels that maps to the second index in the lowest level. In some implementations, the non-transitory computer readable medium can determine a hash value based on the at least the portion of the request received from the client. The non-transitory computer readable medium can identify, using the hash value, a second index of the plurality of indices in the lowest level. The non-transitory computer readable medium can iteratively map the second index in the lowest level to the index in the highest level of the plurality of indices in the highest level.

These and other aspects and implementations are discussed in detail below. The foregoing information and the following detailed description include illustrative examples of various aspects and implementations, and provide an overview or framework for understanding the nature and character of the claimed aspects and implementations.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1A:
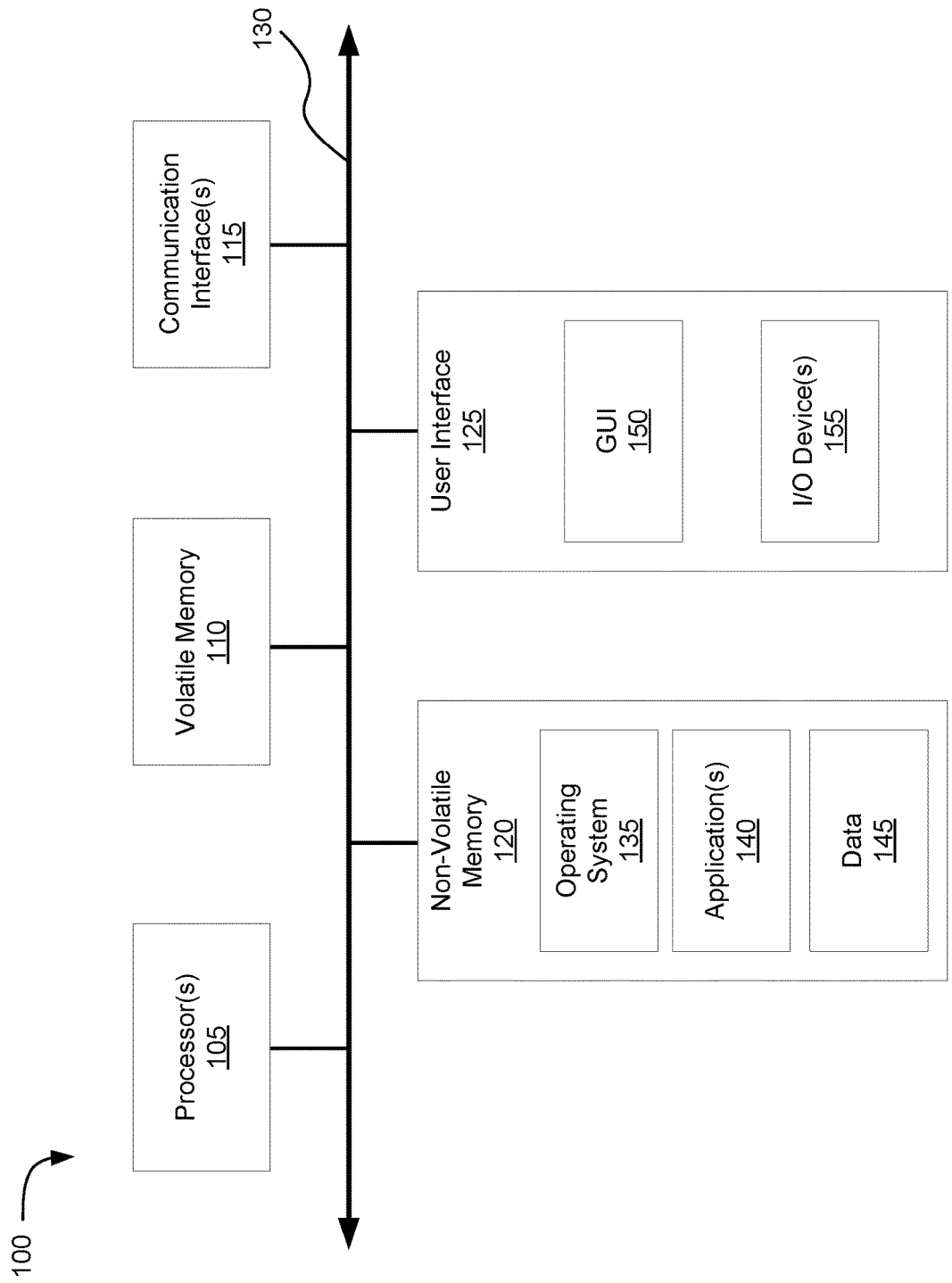
FIG. 1A is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes systems and methods of improving load balancing, distribution, and consistency to nodes of a computing environment.

A. Computing Environment

Prior to discussing the specifics of embodiments of the systems and methods of an appliance and/or client, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
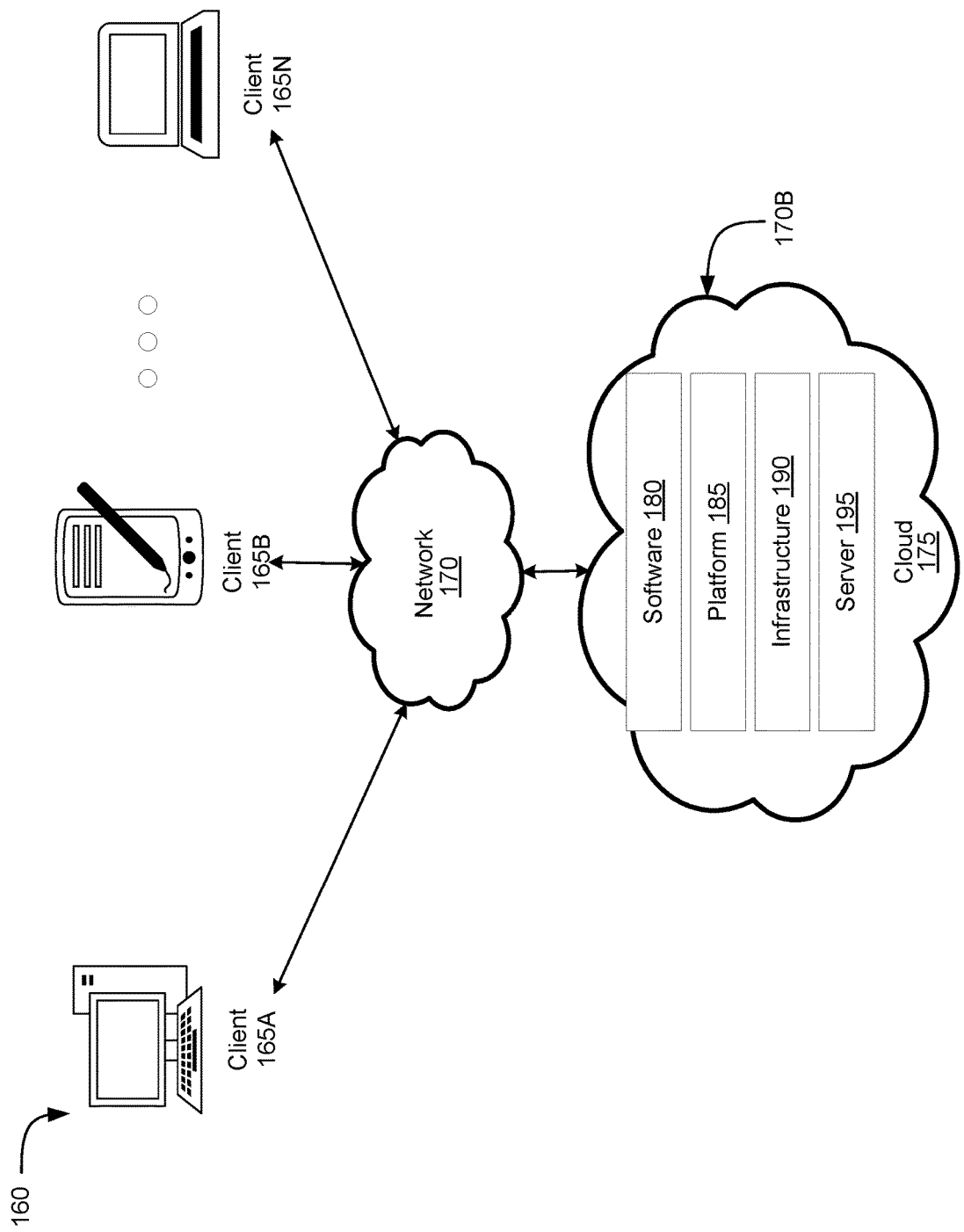
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165a-165n, in communication with a cloud 175 over one or more networks 170. Clients 165 may include, e.g., thick clients, thin clients, and zero clients. The cloud 108 may include back end platforms, e.g., servers, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 108 may include public servers that are maintained by third parties to the clients 165 or the owners of the clients 165. The servers may be located off-site in remote geographical locations as disclosed above or otherwise. Public clouds 175 may be connected to the servers over a public network 170. Private clouds 175 may include private servers that are physically maintained by clients 165 or owners of clients 165. Private clouds 175 may be connected to the servers over a private network 170. Hybrid clouds 175 may include both the private and public networks 170 and servers.

The cloud 175 may include back end platforms, e.g., servers, storage, server farms or data centers. For example, the cloud 175 can include or correspond to a server or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Systems and Methods of Improving Load Balancing, Distribution, and Consistency Systems and methods of improving load balancing, distribution, and consistency to endpoint devices (e.g., servers or backend services) are provided. Clients and servers can exchange information or data (e.g., data packets) to perform operations or tasks, access resources, among others by establishing communication sessions. Data sent to the servers can be in the form of traffic, which can be distributed to various servers available in a computing environment. An application delivery controller ("ADC") can manage the distribution or which server to forward the traffic from clients. The ADC can adapt to the increase in dynamic application workloads as servers automatically scale to adjust the amount of computational resources in a server farm used to handle or process requests from client devices.

The servers in the computing environment can be deployed using a stateless mesh architecture, which can achieve 99.9999% reliability, for example. The ADC can use a consistent hash algorithm as a method for distributing traffic to the servers deployed with stateless architectures. The ADC can use the consistent hash algorithm to achieve both fault tolerance and uniform load distribution. Fault tolerance can refer to the ability of the ADC to handle node or network failures for redirecting traffics to other available servers. However, it can be challenging to utilize the consistent hash algorithm (e.g., existing open-source consistent hashing algorithms) while accounting for, or without sacrificing, one or more features. For example, it can be challenging for the consistent hashing algorithm to account for uniform load distribution, consistency during failures, resource consumption, or algorithmic performance to perform a lookup for an available server. Further, some algorithms may be unavailable as open-source algorithms for the ADC to distribute loads across different servers. Examples of a consistent hashing algorithm can include Couchbase automated data partitioning, OpenStack object storage service swift, Dynamo partitioning component, Apache Cassandra, Voldemont, among others.

The systems and methods of this technical solution can use a jump table-assisted hybrid hash algorithm for consistent load distribution across one or more servers. An ADC or other distributed system for consistent stateless decision-making (e.g., distributed database, key-value storage, distributed memory-caching system ("MemCached"), etc.) can use the hybrid hash algorithm to facilitate or advance towards a stateless architecture. The ADC or other distributed system can include or be a device using the hybrid hash algorithm for distributing loads across servers. The hybrid hash algorithm can provide the necessary consistency and load distribution with reduced impact on the computing processing unit ("CPU") by being stateless.

Further, the device can use the hybrid hash algorithm to perform a lookup for available servers with $O(\log_m N)$ performance. The m can denote the size of each word (e.g., collection or combination of bits). The N can denote the size of a hash table including indices listing the servers. The device can use the hybrid hash algorithm to construct a bit map having $\log_m N$ number of levels to improve lookup time. The device can construct the bit map based on at least the hash table having size N. The hash table can include indices listing one or more servers available to serve a request. The individual bits or words from each level within the bit map can be associated with one or more servers indicating whether the one or more servers are available. The lookup time can reflect the number of levels within the bit map.

The device or other devices (e.g., ADCs or distributed systems) can use the constructed bit map (sometimes referred to as a table) to select and distribute traffic received from client devices across servers using the hybrid hash algorithm. For example, the device can use a portion of the request to determine or calculate a client hash value. The device can map the client hash value to one of the indices of the hash table. With the mapped index, the device can iteratively map the index to one or more other indices at the higher level in the bit map until the highest level (e.g., the last level within the bit map). The device can go through the table to find a non-zero entry at the highest level. The device can identify a set bit position, which can lead to an index at a lower level. The device can iterate the process to determine an index at the lowest level (e.g., the hash table with indices listing the servers).

The device can select the backend server at the index of the lowest level to establish a session and serve requests from a respective client. With the selected server or backend service, the device can forward subsequent requests from the client to the same server. Hence, the device can ensure that the load is distributed among other servers and consistency is maintained using the hybrid hash algorithm to construct a table (e.g., bit map) and perform the lookup for one or more servers to handle client requests. Further, the device can reduce resource consumption by not having to re-generate a lookup table. Instead, the device can update the bits or words of the bit map based on the availability of the servers. Thus, by leveraging a hybrid hash algorithm to distribute traffic from clients to servers, the systems and methods described herein can at least improve the uniformity of load distribution across backend servers or services, improve consistency during network failures, minimize lookup time or the time to take a load balancing ("LB") decision, improve CPU performance to a constant time of $O(log_m N)$, and reduce resource consumption, such as from not having to regenerate the bit map or hash table when a server goes down.

Figure 2:
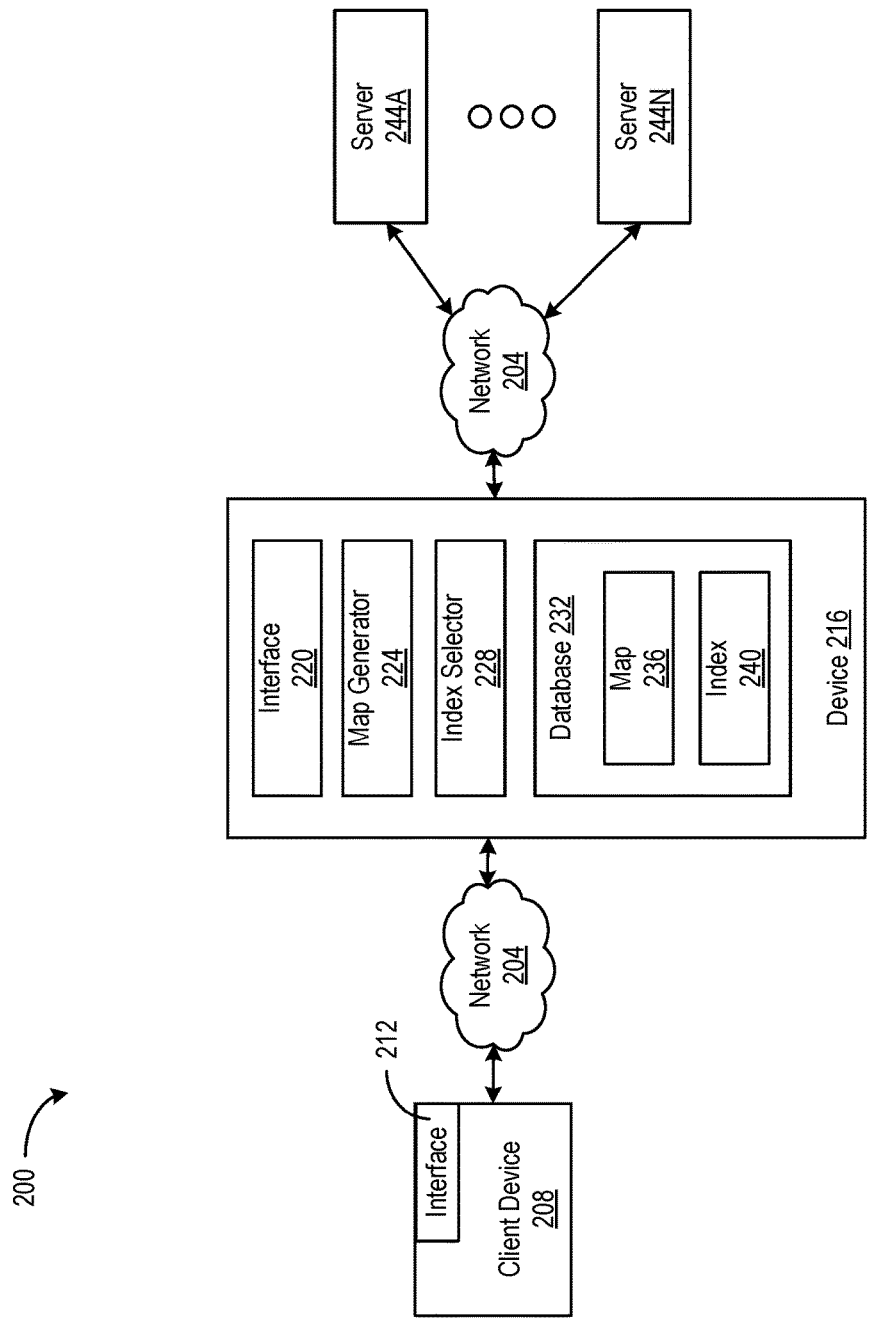
FIG. 2 is a block diagram of a system for improving load balancing, distribution, and consistency to nodes of a computing environment, in accordance with an embodiment.

Referring now to FIG. 2, depicted is a block diagram of a system 200 improving load balancing, distribution, and consistency to nodes (e.g., servers or backend services) of a computing environment. The system 200 can include one or more networks 204, at least one client device 208, at least one device 216, and one or more servers 244A-N (sometimes generally referred to as server(s) 244). The device 216 can include or be an ADC, a distributed system, or an intermediary appliance executing between the client device 208 and the servers 244. The one or more components (e.g., client device 208, device 216, or servers 244) of the system 200 can establish communication channels or transfer data via the network 204. For example, the client device 208 can communicate with the device 216 through a first network and the device 216 can communicate with servers 244 via a second network. In some cases, the first network and the second network can be the same network 204. In some other cases, the first network and the second network may be different networks 204 bridging or enabling communication between different devices or components of the system 200. The traffic from the client device 208 can be handled by at least one of the servers 244. The device 216 can route or forward the traffic to one of the servers 244.

The network 204 can include computer networks such as the Internet, local, wide, metro or other area networks, intranets, satellite networks, other computer networks such as voice or data mobile phone communication networks, and combinations thereof. The network 204 may be any form of computer network that can relay information between the one or more components of the system 200. The network 204 can relay information between client devices 208 and one or more information sources, such as web servers or external databases, amongst others. In some implementations, the network 204 may include the Internet and/or other types of data networks, such as a local area network (LAN), a wide area network (WAN), a cellular network, a satellite network, or other types of data networks. The network 204 may also include any number of computing devices (e.g., computers, servers, routers, network switches, etc.) that are configured to receive and/or transmit data within the network 204. The network 204 may further include any number of hardwired and/or wireless connections. Any or all of the computing devices described herein (e.g., client device 208, device 216, servers 244, etc.) may communicate wirelessly (e.g., via Wi-Fi, cellular, radio, etc.) with a transceiver that is hardwired (e.g., via a fiber optic cable, a CAT5 cable, etc.) to other computing devices in the network 204. Any or all of the computing devices described herein (e.g., client device 208, device 216, servers 244, etc.) may also communicate wirelessly with the computing devices of the network 204 via a proxy device (e.g., a router, network switch, or gateway). In some implementations, the network 204 can be similar to or can include the network 170 or a computer network accessible to the computer 100 described herein above in conjunction with FIG. 1A or 1B.

The system can include at least one client device 208 (or various client devices 208). Client device 208 can include at least one processor and a memory, e.g., a processing circuit. The client device 208 can include various hardware or software components, or a combination of both hardware and software components. The client devices 208 can be constructed with hardware or software components and can include features and functionalities similar to the client devices 165 described hereinabove in conjunction with FIGS. 1A-B. For example, the client devices 165 can include, but is not limited to, a television device, a mobile device, smart phone, personal computer, a laptop, a gaming device, a kiosk, or any other type of computing device.

The client device 208 can include at least one interface 212 for establishing a connection to the network 204. The client device 208 can communicate with other components of the system 200 via the network 204, such as the device 216 or the servers 244. The interface 212 can include hardware, software, features, and functionalities of at least a communication interface(s) 115 or user interface 125 as described hereinabove in conjunction with FIG. 1A. For example, the client device 208 can communicate data packets with one or more servers 244 through a device 216 intermediate between the client device 208 and the servers 244. The client device 208 can transmit data packets to the device 216 configured to select and forward the data packets from the client device 208 to at least one server 244. In some cases, the client device 208 can communicate with other client devices.

The client device 208 can include, store, execute, or maintain various application programming interfaces ("APIs") in the memory (e.g., local to the client device 208). The APIs can include or be any types of API, such as Web APIs (e.g., open APIs, Partner APIs, Internal APIs, or composite APIs), web server APIs (e.g., Simple Object Access Protocol ("SOAP"), XML-RPC ("Remote Procedure Call"), JSON-RPC, Representational State Transfer ("REST")), among other types of APIs or protocol described hereinabove in conjunction with clients 165 of FIG. 1B. The client device 208 can use at least one of various protocols for transmitting data to the server 244. The protocol can include at least a transmission control protocol ("TCP"), a user datagram protocol ("UDP"), or an internet control message protocol ("ICMP"). The data can include a message, a content, a request, or otherwise information to be transmitted from the client device 208 to a server 244. The client device 208 can establish a communication channel or a communication session with a server 244 selected by the device 216 to maintain uniformity in load balancing across the servers 244. In some cases, the client device 208 can transmit data to the server 244 via an established communication session. In some other cases, the device 216 can intercept data from the client device 208 and determine which server 244 should be handling information from the client device 208.

The system 200 can include one or more servers 244. One or more of the servers 244 can include, be, or be referred to as a node, remote devices, remote entities, application servers, backend server endpoints, or backend services. The server 244 can be composed of hardware or software components, or a combination of both hardware or software components. The server 244 can include resources for executing one or more applications, such as SaaS applications, network applications, or other applications within a list of available resources maintained by the server 244. The server 244 can include one or more features or functionalities of at least resource management services or other components within the cloud computing environment. The server 244 can communicate with the client device 208 via a communication channel established by the network 204, for example.

The server 244 can receive data packets or traffic from at least the client device 208 via the device 216. The server 244 can be selected by the device 216 to serve or handle the traffic from various clients. The server 244 can be associated with a server hash or an index in a list of servers within a hash table. In some cases, the server 244 can include or be a virtual server. In this case, the virtual server can include a hash table including indices listing backend services. Selecting a backend service can refer to or be similar to selecting a server 244 to handle a request from the client device 208, as discussed herein. The server 244 can be selected by the device 216 using at least one of various consistent hash algorithms. The server 244 can be selected by the device 216 using a jump table-assisted hybrid hash algorithm to provide uniform LB and consistency.

The server 244 can establish a communication session with the client device 208 responsive to the device 216 selecting the server 244 to handle the traffic from the client device 208. The server 244 can serve the traffic based on the request or instructions from the client device 208, such as to store information, update or configure data on the server, obtain data from the server, among others. The server 244 can transmit data packets to the client device 208 to acknowledge receipt of the data packets or to satisfy a request, for example. The server 244 can communicate with the client device 208 directly after establishing the communication session. In some cases, the server 244 can transmit data packets to the client device 208 through an intermediary device, such as the device 216. In some cases, the server 244 can transmit data packets to the device 216 indicating the availability of the server 244 to handle requests. In some cases, a lack of data packets or response from the server 244 to the device 216 can indicate that the server 244 is not available to handle requests.

The system 200 can include at least one device 216. The device 216 can include, be, or be referred to as an intermediary device, an appliance, a data processing system, a distributed system, or an Application Delivery Controller ("ADC"), for example. The device 216 can be composed of hardware or software components, or a combination of hardware and software components. The device 216 can be intermediate between client devices 208 and servers 244. The device 216 can include features or functionalities of an ADC or a distributed system. For instance, the device 216 may manage the request to establish a communication session from the client device 208 to the server 244. The requests or data packets from the client devices 208 to the servers 244 can be referred to as traffic. The device 216 can manage communication flow between the client devices 208 and the servers 244 by forwarding the traffic from the client devices 208 to one or more servers 244. In some cases, the device 216 can manage traffic from the client devices 208 without managing traffic from the servers 244 to the client devices 208. The device 216 may not alter the content of the data packets from the client device 208 or the server 244. The device 216 can include other components (e.g., processors and memory) to perform features and functionalities described herein.

The device 216 can include various components to manage traffic from the client device 208 to the servers 244. The device 216 can include at least one interface 220, at least one map generator 224, at least one index selector 228, and at least one database 232. The database 232 can include at least one map data storage 236 and at least one index data storage 240. The map data storage 236 can be referred to generally as map 236, table storage, bit map storage, or hash storage. The index data storage 240 can be referred to generally as index 240. Individual components (e.g., interface 220, map generator 224, index selector 228, or database 232) of the device 216 can be composed of hardware, software, or a combination of hardware and software components. Individual components can be in electrical communication with each other. For instance, the interface 220 can exchange data or communicate with the map generator 224, index selector 228, or database 232. The one or more components (e.g., the interface 220, the map generator 224, the index selector 228, or the database 232) of the device 216 can be used to perform features or functionalities discussed herein, such as uniformly balance or distribute loads across different servers 244 or lookup at least a server 244 to handle requests from the client device 208.

The interface 220 can interface with the network 204, devices within the system 200 (e.g., client devices 208 or servers 244), or components of the device 216. The interface 220 can include features and functionalities similar to the communication interface 115 to interface with the aforementioned components, such as in conjunction with FIG. 1A. For example, the interface 220 can include standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The interface 220 can include at least a built-in network adapter, network interface card, PCMCIA network card, EXPRESSCARD network card, card bus network adapter, wireless network adapter, USB network adapter, modem, or any other device suitable for interfacing one or more devices within the system 200 to any type of network capable of communication. The interface 220 can communicate with one or more aforementioned components to receive data from client devices 208 for forwarding to one of the servers 244 to perform load balancing.

The device 216 can include a map generator 224. The map generator 224 can be referred to as a hash generator, a table generator, or a bit map generator. The map generator 224 can be configured to generate a hash table as part of the jump table-assisted hybrid hash algorithm (sometimes referred to generally as a hybrid hash algorithm). The map generator 224 can generate a bit map based on the hash table. In some cases, the map generator 224 can generate the hash table which includes the bit map. The hash table can be referred to as a jump table. For example, the map generator 224 can use the jump table to determine and select a server 244 for servicing client requests. The map generator 224 can store the generated table or bit map in the map storage 236. The map generator 224 can monitor the statuses of the servers 244, such as whether they are online, offline (e.g., down), available, or unavailable to receive requests.

The map generator 224 can generate a hash table including indices. Individual indices can correspond to a list of one or more servers 244. The list of servers 244 can be formed from multiple hashes of individual servers 244. The hashes can be finger hash values corresponding to the servers 244. To generate the hash table, the map generator 224 can identify various backend servers 244 of a virtual server. The backend servers 244 can be a part of the virtual server. The virtual server can be configured with multiple backend servers 244, each to serve different client devices 208. By having multiple servers 244 for a virtual server, resources from the virtual server can be distributed across the backend servers 244 to handle different types of requests.

The map generator 224 can identify the number of fingers for individual servers 244 (e.g., backend server 244) configured by the administrator of the device 216. The number of fingers can represent the different numbers of finger hash values to generate for representing a single server 244. For example, the map generator 224 can generate N hashes for each server 244. The map generator 224 can determine or calculate the finger hash value for individual fingers of the server 244 using formula (1). The finger hash value can be denoted as FHV. The map generator 224 can use formula (1) to calculate FHVs for other fingers.

$$FHV_{Sn} = \left( FHF(F1(Sn), F2(m)) | m \in \{1, 2, \ldots, N\} \right) \quad (1)$$

For example, the map generator 224 can calculate the FHV for the $n^{th}$ server denoted as Sn. The map generator 224 can calculate for FHV by using a finger hash function on values output by F1 and F2. The finger hash function can be denoted as FHF. The F1 and F2 can denote a first function and a second function, respectively. The map generator 224 can provide the values output by F1 and F2 as inputs into the FHF. The map generator 224 can provide $S_n$ as input to F1, such as information corresponding to the $n^{th}$ server 244. The map generator 224 can provide m as input to F2, where m denotes the number of fingers for individual servers 244.

The function F1 can be described using formula (2). The map generator 224 can compute for a hash value using F1. For example, the map generator 224 can use a server hash function to calculate the hash value. The server hash function for computing a hash value for the server can be denoted as SHF. The map generator 224 can use any hash function that outputs a hash value, such as an identity hash function, division hashing, algebraic coding, multiplicative hashing, Fibonacci hashing, etc. The map generator 224 can use a portion of the information of $S_n$ as inputs into the SHF. For example, the portion of $S_n$ can include at least an internet protocol ("IP") address or a port of the server 244. The IP address of the $S_n$ can be denoted as $IPAddress_{sn}$. The Port of the $S_n$ can be denoted as $Port_{sn}$. The IP address can be a local IP address or a remote IP address of the server 244. The port of the server 244 can be a listener port for listening to requests, for example. In some cases, the map generator 224 can use other information of $S_n$ to compute for F1. The map generator 224 can request information from the server 244 that can be used to calculate the hash value. The requested information can be similar types of information included in requests from client devices 208.

$$F1(S_n) = SHF(IPAddress_{sn}, Port_{sn}) \quad (2)$$

The function F2 can be described using formula (3). The map generator 224 can obtain an output for F2 by identifying a prime number for the finger m. The prime number can be denoted as p, which can be a member or a subset of various prime numbers P. The finger m can represent the count or iteration for calculating the fingers of a server 244. For example, in a first iteration, the m can be 1, in a second iteration, the m can be 2, etc. In further example, the set of prime numbers P can be represented as $\left( P_1, P_2, \ldots, P_N \right)$. The finger m can represent the index or position of a list of prime number P, such that $p_m$ can represent the prime number at index m of the list P. If m=1, the $p_m$ can include the value of $P_1$, if m=2, the $p_m$ can include the value of $P_2$, etc. The prime numbers P can include any prime number. Using function F2, the map generator 224 can determine or obtain a prime number for calculating the FHV for the server 244.

$$F2(m) = \left( p_m | p \in P \right) \quad (3)$$

The FHF can be further described in formula (4) for calculating the FHV. For example, the FHF can be represented as a hash of the first function F1 and the second function F2. This hash can be denoted as H1. The map generator 224 can use any hash function for H1. For example, the map generator 224 can use the same hash function as SHF or a different hash function from SHF. The map generator 224 can aggregate the values of F1 and F2 as inputs into H1. For example, the map generator 224 can exponentiate the value or output of F1 with the value of F2. The map generator 224 can aggregate F1 and F2 using other aggregation techniques, such as multiplying, adding, dividing, or averaging, among others between the two values.

$$FHF(F1(S_n), F2(m)) = H1(F1(S_n)^{\wedge} F2(m)) \quad (4)$$

Responsive to hashing the aggregated F1 and F2, the map generator 224 can obtain or determine the FHV for the finger of the server 244. The map generator 224 can repeat the process of using formulas (1)-(4) to calculate FHV for other fingers of the servers 244. The map generator 224 can follow the following pseudocode to compute the FHV for servers 244. In this case, the map generator 224 can use the combination of formulas (1)-(4) to determine the FHV of the fingers 1–N for individual servers 244.

For $m=1 \ldots N$ do $FHVSn(m) = H1(F1(Sn)^{\wedge} F2(m))$

Done

The map generator 224 can generate a hash table with a predetermined size for each virtual server. The predetermined size can be configured by the administrator of the device 216. For example, the map generator 224 can be configured with a hash table having a size of 128K indices. In some cases, the 128K can indicate 128K bytes for storing at least the FHV, the index of the FHV, or other information associated with the servers 244. If there are 140K servers 244, the map generator 224 can associate a first portion of the servers 244 with a first hash table and a second portion of the servers 244 with a second hash table for the virtual server. The first portion of servers 244 or the second portion of servers 244 having a size of less than 128K (e.g., the predetermined size of the hash table).

In some cases, the size of the hash table can be based on the number of backend servers 244 of the virtual server. For example, the map generator 224 can generate a hash table based on the number of backend servers 244 supported or maintained by the virtual server. The backend servers 244 may be available or unavailable. The map generator 224 can generate indices within the hash table associated with the respective servers 244. The map generator 224 can generate or assign the FHV of each server 244 to an index within the hash table. In some cases, the map generator 224 can associate each index within the hash table with multiple servers 244. In this case, when selecting the index having multiple servers 244, the device 216 can select one of the servers 244 with the index by using a consistent hashing algorithm, for example.

The hash table for the virtual server can be denoted as VSHT. The map generator 224 can calculate an index for individual servers 244 to be inserted in the VSHT. The map generator 224 can calculate the index using FHV of the server 244. The map generator 224 can insert the indices of the servers 244 into the VSHT. The indices can be associated with the FHVs of the respective servers 244. In some cases, the map generator 224 can insert an index into the VSHT representing a server 244 or a finger of the server 244. In this case, the VSHT can include or represent a list of servers 244. In some other cases, the map generator 224 can group multiple indices of one or more servers 244 into a single index. The map generator 224 can insert the single index including the list of one or more servers 244 into the VSHT. In this case, individual indices of the VSHT can include a list of one or more servers 244. Further, in this case, the map generator 224 can group multiple indices into a single index based on a range of indices (e.g., 10 indices for each index within the VSHT), for example.

The map generator 224 can calculate the indices of the servers 244 to be inserted in the VSHT by using formula (5). The indices to be inserted into the table VSHT can be denoted as VHTI representing the virtual hash table index. For example, the map generator 224 can calculate the VHTI for the $n^{th}$ server by computing the hash of the FHV of the finger m of server $S_n$. The map generator 224 can calculate the VHTI for each iteration m of the server 244. The function HTF can be described using equation (6). The map generator 224 can use formulas (5) and (6) to compute for VHTI.

$$\text{VHTI}_{Sn} = \left( \text{HTF}(\text{FHV}_{Sn}(m)) | m \in \{1, 2, \ldots, N\} \right) \quad (5)$$

$$\text{HTF}(\text{FHV}_{Sn}(m)) = \text{FHV}_{Sn}(m) \bmod \text{HTS} \quad (6)$$

For example, the map generator 224 can take the FHV of the finger m of server $S_n$. With equation (6), the map generator 224 can modulo the value of FHV by the size of the table HTS, which denotes the hash table size. By executing formula (6), the map generator 224 can obtain or determine an index of $S_n$ for insertion into the VSHT. The map generator 224 can use the following pseudocode to calculate the indices of the fingers of individual servers 244.

For m=1 ... N do

HTF(FHV$_{Sn}$(m))=FHV$_{Sn}$(m)% HTS

Done

The map generator 224 can insert the VHTI of the server 244 into the VSHT at the index indicated by the VHTI. For example, the map generator 224 can use a HashTableInsert function for inserting the index of the server 244 into the hash table. The HashTableInsert function can be represented as HashTableInsert(Sn, VHTI$_{Sn}$(m)). The map generator 224 can use $S_n$ and the VHTI of $S_n$ as inputs into the HashTableInsert function. With the HashTableInsert function, the map generator 224 can navigate through the VSHT to identify the index corresponding to the VHTI. Accordingly, the map generator 224 can insert the server 244 (e.g., information corresponding to the server 244) into the index of the VSHT. In further example, the map generator 224 can use the following pseudocode to insert VHTIs of individual fingers into the hash table.

For m=1 ... N do

HashTableInsert(Sn,VHTI$_{Sn}$(m))

Done

The map generator 224 can generate a virtual server bit table to reduce the lookup time to select one or more servers 244 for servicing requests. The virtual server bit table can be denoted as VSBT. The map generator 224 can construct the VSBT based on the VSHT. For example, the map generator 224 can construct the VSBT with multiple levels. The number of levels within the VSBT can be based on at least the size of the VSHT (e.g., HTS) and the size of each word. The word can include or represent a combination or group of various bits. The size of each word can be denoted as M, for example. The map generator 224 can compute the number of levels to construct for the VSBT by computing $\log_M(\text{HTS})$. For example, with HTS of 128K indices and M of 64 bits, the map generator 224 can compute $\log_{64}(128K)$ to obtain an output of approximately two, in this case. Hence, with the given hash table size and word size, the map generator 224 can determine the number of levels to construct for the bit map.

Each level within the VSBT can include indices associated with one or more indices of the lower level within the VSBT. For example, the index of a first level can include various bits of a second level prior to or lower than the first level. The map generator 224 can include the lowest level at level 0, and the highest level at a level based on the result of $\log_M(\text{HTS})$. The lowest level of the bit map can correspond to or be the VSHT having indices listing the servers 244. In some cases, the lowest level of the bit map can refer to level 1. In this case, one or more indices of the lowest level can identify or represent the availability of one or more servers 244 based on the bit value. The map generator 224 can construct the bit map with each index of level 1 representing the index of the VSHT (e.g., level 0). The map generator 224 can assign or determine a bit value in each index of a current level based on one or more bit values of the indices at another level directly below or lower than the current level. The map generator 224 can construct the indices, bits, or table in each level similar to other levels, such as by repeating the process described herein for each level.

The map generator 224 can initiate the bit map with all indices set to zero. The map generator 224 can set the bit in each index if the corresponding one or more indices in a previous level has at least one server 244 that is ready or available to handle traffic from a client device 208. For example, the map generator 224 can set a bit in level 1 if the corresponding index of the VSHT includes at least one server 244 that is ready to handle client traffic. In level 2, the map generator 224 can set a bit if one or more corresponding indices in level 1 has a non-zero bit. The one or more corresponding indices can be referred to as a word. The map generator 224 can set the bits in subsequent levels if the one or more corresponding indices in the previous levels are non-zero. Setting the bit can refer to the map generator 224 changing the bit to one.

In some cases, one or more indices within the VSHT may not include an available server 244. In this case, the map generator 224 may not set the bit (e.g., maintain the bit value at zero) for an index of a level that corresponds to one or more indices of a previous level. The map generator 224 can use a Setbit function to set the bit at an index of a level. The Setbit function can be described as follows.

$$\left\langle \left( \text{Setbit}(F3(\text{index}_{l-1}), l) | l \in \{1, \ldots N\} \right) \\ | \text{index}_0 \in R \right\rangle$$

The Setbit can take an index return by a function F3 and the level l to set the bit as inputs. The map generator 224 can set at least one bit of one or more indices within the level l. The map generator 224 can set the bit of an index corresponding to one or more indices of the previous level (e.g., $\text{index}_{l-1}$). The map generator 224 can set the bit returned by the F3 function in a specified level. The map generator 224 can use the F3 function to identify an index at level l and the corresponding offset within that index at level l to set the bit based on the index at a previous level. The offset can refer to the position of the bit within an index. In this case, the map generator 224 can determine the index at level l, and the position of one of the bits within the index at level l to set.

The level l can be a member or a subset of one or more levels within the bit map, such as ranging from 1 to N. The index/can represent an index value at level l. The $\text{index}_0$ can represent an index at level 0, where level 0 can represent the VSHT. The R can represent a list of all indices that have at least one available server 244. Hence, in this example, the map generator 224 can use the Setbit function to set one or more bits of levels 1 to N based on the availability of at least one of the servers 244 in the VSHT.

The F3 function can be described as F3(index)=(index, bitoffset). Using the F3 function, the map generator 224 can determine the offset value (e.g., the position of the index) based on at least the index of the previous level (e.g., level l−1) and the word size. The word size can refer to the number of bits within individual indices, such as 1 byte, 2 bytes, 4 bytes, 8 bytes, etc. The word size can be denoted as w. The map generator 224 can follow the following pseudocode to obtain an index at level l from the function F3.

F3(index)

do

Return(($w^{-1}$*index),(index % w))

Done

For example, the map generator 224 can insert an index at a previous level l−1 as an input for the F3 function. The map generator 224 can determine the index to set the bit at level l by calculating $w^{-1}$*index. The map generator 224 can determine the offset of the bit within the index at level l by calculating index % w. In this example, the index can refer to $\text{index}_{l-1}$, such that when using the function F3, the map generator 224 can determine $\text{index}_l$ and the bit offset of $\text{index}_l$. The computed index returned by function F3 can be rounded to the nearest whole value or the next nearest whole value. For example, if w=64 and $\text{index}_{l-1}$=1, the map generator 224 can round the value of 0.016 (e.g., 1/64) to an index value of 1 at level 1. The map generator 224 can calculate the offset by computing the 1% 64=1. Accordingly, in this example, the map generator 224 can determine to set a bit at position 1 of index 1 in level 1. The position of the bits within individual indices of each level can be counted from 0 to w−1.

The map generator 224 can update the bit map or the bit table VSBT in response to determining the index and bit offset at level l to set a bit value. The map generator 224 can use the Setbit function to update the bit map. The map generator 224 can iteratively update the bit map based on the availability of the servers 244 within the VSHT. The map generator 224 can follow the following pseudocode to update the VSBT.

For i in 1 ... l do (index,bitoffset)=F3(index)

Setbit(index,bitoffset,l)

Done

For example, the map generator 224 can determine whether to set one or more bits of individual indices of each level l. The map generator 224 can determine the index and the offset to set the bit at level l based on an index at level l−1 using function F3. Further, the map generator 224 can determine the index and other offsets to set the bits at level l based on other corresponding indices at level l−1 using function F3. Responsive to determining the index and bit offset, the map generator 224 can use the Setbit function to update the bit map by setting at least one bit at the bit offset in the index returned by function F3. The map generator 224 can reiterate or repeat the process for setting one or more bits for other levels within the bit map.

In another perspective, the map generator 224 can identify all indices at a lower level to set one or more bits at a higher level within the bit map. For example, the map generator 224 can determine whether at least one of the servers 244 in each index of the VSHT is available. Responsive to determining that at least one server 244 is available in an index, the map generator 224 can set a bit at an index and an offset of a first level of the bit map. Further, for each level lower than the highest level of the bit map, the map generator 224 can determine at least one non-zero index to set a bit at an index and an offset at a higher level. The map generator 224 can repeat the process for setting bits up to the highest level constructed by the map generator 224.

In further example, the map generator 224 can set one or more bit values of an index of level l to a non-zero value based on at least one server 244 associated with the indices of a lower level being available to service requests from client devices 208. In this example, the map generator 224 can set bit values of a higher level up to the highest level based on an indication of an available server 244. The map generator 224 can set the bit at an index of a higher level associated with one or more indices of the lower level. In some cases, the map generator 224 may not set the bit at a higher level or set the bit to zero based on the unavailability of the servers 244 in the associated indices at the lower level. For example, the map generator 224 can set bit values of an index in a subsequent level to zero based on none of the servers 244 associated with the index being ready to service the requests from the client devices 208.

The map generator 224 can identify, determine, or obtain the statuses of the servers 244 based on communicating with the one or more servers 244. For example, the map generator 224 can receive a data packet indicating that the server 244 is available or unavailable to receive requests from a different client device 208. In another example, the map generator 224 can receive data packets from the server 244 indicating at least that the server 244 is online or the status of the server 244. The map generator 224 can receive the data packets periodically (e.g., every hour, 2 hours, etc.) or in response to the map generator 224 transmitting a request for acknowledgment. In some cases, the map generator 224 may not receive data packets from at least a server 244 for a predetermined time period (e.g., 1 minute, 2 minutes, 3 minutes, 5 minutes, etc.) or at the predetermined periodical time. The predetermined time period can include or be a timeout period indicating that the server 244 is unresponsive, offline, or is unavailable to handle requests. In this case, the map generator 224 can mark one or more server 244 as unavailable in response to a timeout or based on not receiving a data packet from the server 244. The map generator 224 can mark the server 244 as unavailable by updating one or more bits or words associated with the server 244 in the hash table or bit map.

Accordingly, with the generated VSBT, the map generator 224 can maintain bit values indicative of server 244 availability stored in indices arranged in multiple levels. The lowest level within the generated map can include various indices corresponding to the list of servers 244 repeated multiple times (e.g., multiple fingers). The individual indices in a higher level, such as a subsequent level, can be mapped to a respective set of indices in a lower level. For example, individual indices within a second level can be mapped to a group of indices in a first level, individual indices within a third level can be mapped to a group of indices in the second level, etc.

In some cases, the map generator 224 can update one or more bit values stored in the indices of individual levels of the bit map. For example, the map generator 224 can monitor or determine the changes in the availability of one or more servers 244 associated with one or more indices of the VSHT. In response to the changes, the map generator 224 can map each server 244 with changes to the availability to one or more indices and bits within the bit map. The map generator 224 can set the associated bits in the bit map if the server 244 is changed to an available state. Otherwise, the map generator 224 can reset the associated bits in the bit map if the server 244 is changed to an unavailable state.

The device 216 can include an index selector 228 (sometimes referred to as a hash selector, a server selector, or a node selector) configured to select an index representing a server 244 to service a request from a client device 208. The index selector 228 can forward requests from client devices 208 to one or more selected servers 244 to handle the respective requests. The index selector 228 can be configured to provide good distribution and consistency of traffic to the one or more servers 244. Distribution can refer to or be described as the evenness of how the access requests (e.g., items or traffic) are distributed across the servers 244 or buckets. Having good consistency can refer to or be described as having no movements from items in various buckets aside from one or more buckets that are removed from the list of available servers 244 (e.g., a list of buckets) or have gone down. For instance, if a bucket is removed from the list of buckets, the items from the removed bucket can be forwarded or moved to the other buckets. No other movements should occur for items in other buckets. Further, if the bucket is brought back into the list of buckets or back online, only items previously moved to other buckets during the removal of the bucket should be moved back to the bucket. Accordingly, in this example, consistency can describe the movements of items from a removed bucket or the lack of movements of items from other buckets in the list.

The index selector 228 can receive a request from a client device 208 to access one of the servers 244 of the system 200. Responsive to receiving the request, the index selector 228 can determine a hash value (e.g., client hash value) based on at least a portion of the request received from the client device 208. The portion of the request can include at least an IP address of the client device 208 and a uniform resource locator ("URL") of the request. In some cases, the index selector 228 can use other portions of the request to determine the client hash value. In some other cases, the index selector 228 can use one or more portions of the request having similar types of values as the values for the SHF for computing the FHV.

The index selector 228 can use any hash function, such as a hash function similar to or different from SHF, to compute the client hash value based on the portion the request. The index selector 228 can determine an index within the hash table (e.g., VSHT) based on the client hash value. For example, the index selector 228 can map the client hash value to one of the indices in VSHT similar to computing for the VHTI. In this example, the index selector 228 can apply an HTF to the client hash value to determine an index of the hash table. The index selector 228 can use the same HTF as used to calculate the VHTI. In some cases, the index selector 228 can use a different HTF to calculate the index of the client hash value for mapping into the hash table.

The index selector 228 can map the index of the VSHT into a first level of the VSBT responsive to or after determining the index of the client hash value. The indices discussed herein can be referred to as a first index, a second index, etc. of a particular level as an explanatory example. After identifying an index at a first level, the index selector 228 can iteratively map the index from level l to level l+1 until the highest or last level of the bit map. The index selector 228 can iteratively map an index from one level to another using similar methods, such as determining an index of the higher level that corresponds to the index of the lower level as generated by the map generator 224.

At the highest level of the bit map, the index selector 228 can identify, determine, or obtain a non-zero entry or index of the highest level. The non-zero entry can indicate that the corresponding one or more indices at the lower levels include one or more servers 244 associated with an index that are available to service the request. The index selector 228 can go through the indices of the highest level to obtain a non-zero index. For example, the index selector 228 can perform a lookup through the indices or the table at the highest level in a clockwise direction (e.g., from left to right, up to down, etc.). The index selector 228 can select the first non-zero entry identified through the lookup process. For example, the index selector 228 can reach or map to a first index at the highest level. The index selector 228 can obtain a second index subsequent to the first index having a non-zero bit value.

In some cases, the index selector 228 can perform the lookup in the opposite direction, such as counter-clockwise direction, from right to left, from down to up, etc. In some other cases, the index selector 228 can select a second non-zero index identified in the highest level of the bit map, or a third non-zero index, among others. In another case, the index selector 228 can identify that the first index mapped from the lowest level to the highest level is non-zero. In this case, the index selector 228 can select the first index as the non-zero index to identify one of the servers to serve the client requests. In some cases, the index selector 228 can skip identifying the index of the VSHT corresponding to the client hash value. Instead, in this case, the index selector 228 can proceed to determine or obtain one of the non-zero indices for mapping to an index of the VSHT to determine a server 244.

The index selector 228 can identify the entry as a word. The word can include a set of bits, where the number of bits is equal to the word size. Hence, the index selector 228 can identify a non-zero word at the highest level of the bit map. The index selector 228 can determine or obtain a bit position within the selected entry at the highest level that is set to 1 (e.g., non-zero). For example, the index selector 228 can determine the least significant bit position that is set (e.g., non-zero). The index selector 228 can determine or map to the index at a lower level or a previous level corresponding to the bit of the index at the higher level. The index selector 228 can iteratively map indices from the highest level to the lowest level by identifying a bit value within the index of the higher level indicating that at least one server 244 is available.

In some cases, the index selector 228 can determine other bit positions within the index at the highest level. For example, the index selector 228 can determine the most significant bit position that is set in a first index. The index selector 228 can map the bit of the first index to a second index at a lower level corresponding to the bit of the first index. In further example, if the map generator 224 constructed a bit map of 3 levels (e.g., levels 1, 2, and 3, with a VSHT), the index selector 228 can map from level 3 to level 2 and level 2 to level 1 using a non-zero bit of an index at the respective higher level.

In response to mapping the bit from the highest level to the lowest level of the bit map, the index selector 228 can identify an index in the lowest level (e.g., level 1) of the bit map. The index selector 228 can map to the index at the lowest level that includes a set or a non-zero bit value. The index selector 228 can obtain the server 244 from the hash table associated with the mapped index at the lowest level. Accordingly, the index selector 228 can determine, obtain, or select a server 244 to service the client request for a uniform distribution, consistency, and reduction in resources for load balancing traffic from client devices 208. The index selector 228 can follow the following pseudocode to select a server 244.

Index=$HTF$(clienthash)

For $i$ in 1 ... $l$ do (Index,offset)=$F3$(Index)

done (Index,offset)=$F4$(Index)

For example, the index selector 228 can identify an index within the VSHT corresponding to the client hash index denoted as clienthash. The index selector 228 can use any hash function HTF to determine the index within the hash table, such as the hash function used to determine the VHTI.

The index selector 228 can iteratively map the index from the hash table to the highest level of the bit map based on the client hash value. The index selector 228 can determine an index and the non-zero bit position of the index to determine a server 244 to serve the client device 208. The index selector 228 can proceed to execute the function F4 to map the index at the highest level to an index at the lowest level. The function F4 can be described or represented in the following pseudocode.

For $i$ in $l-1$ ... 1 do

Offset=$lsb$(Index)

Index=$F5$(Index,offset)

done

In view of function F4, the index selector 228 can iteratively map a first index at the highest level to a second index at a lowest level. The index selector 228 can repeatedly execute F4 until the lowest level. For example, from level $l-1$ down to level 1, the index selector 228 can map the bit to an index at a lower level by inputting the index and the bit offset into the function F5. The index selector 228 can determine the offset by inserting the index of level l into a least significant bit function. The least significant bit function can be denoted as lsb. The lsb can take the index at level l and return the least significant bit that has a bit value of non-zero within the index. The index selector 228 can execute F5 to take the index and the bit offset at level l and return the corresponding index at level $l-1$. The F5 function can be represented as follows.

$F5$(index,offset)

do return index*$w$+offset done

For example, the index selector 228 can use the index at level l and the offset of the bit as inputs into function F5. The index selector 228 can execute the function F5 to return a value of (index*w+offset). For example, each index at a higher level can correspond to multiple indices of the word size w, representing the number of bits in each word. Therefore, the index selector 228 can multiple the index at level Z to the word size w and add the offset to determine an index at the lower level corresponding to the higher level index.

Using the functions, such as F3, F4, F5, and lsb, the index selector 228 can iteratively map from an index at the highest level to an index at the lowest level. To select a server 244 associated with the index at the lowest level, the index selector 228 can insert the selected index at level 1 (e.g., the lowest level) to a function findBestBackend. The findBestBackend function can be described as $S_i$=findBestBackend (index). The i in $S_i$ can represent the client hash value or the client device 208 to be serviced by a selected server 244. In some cases, the index selector 228 can insert the index of the VSHT corresponding to the selected index at level 1 to the findBestBackend function. For example, the index selector 228 can execute the findBestBackend which can use the index of the VSHT as an input. The findBestBackend function can return the server 244 at the index selected in the lowest level. The functions described herein can include different names, terms, among other features to perform the functions described above.

In some cases, the index at the lowest level can include multiple bit values associated with indices of the hash table. In this case, the index selector 228 can determine or select a non-zero bit similar to selecting one of the bits from the index at the highest level. Responsive to determining or obtaining the index of the hash table, the index selector 228 can select the server 244 associated with the index of the hash table to service the request. In further cases, individual indices of the hash table can include a list of available servers 244. In this case, the index selector 228 can select one of the servers 244 by selecting the first or the last server 244 available within the list of servers 244.

In some cases, the one or more servers 244 servicing the client requests may become unavailable. In this case, the index selector 228 can select one or more other servers 244 to service the traffic in response to server flaps or server status changes. For example, the index selector 228 can monitor the status of individual servers 244. In response to a server 244 going down, the index selector 228 can reroute or redirect the traffic destined for the downed server 244 to be served by at least one different server 244. The index selector 228 can select the server 244 using the VSHT and the generated bit map. The index selector 228 can maintain the previous server 244 serving the traffic in the database 232. In response to the flapped server 244 becoming available, the index selector 228 can re-forward traffic from the client devices 208 to the servers 244 previously servicing the respective client requests.

The device 216 can include a database 232. The database 232 can be referred to as a storage device, a data repository, or a memory. The database 232 can be physical storage volumes and virtual storage volumes or arrays thereof. The database 232 can include, store, or maintain information received from the client device 208. In some cases, the database 232 can store information received from the server 244. For example, the database 232 can store messages received from the client device 208 to be transmitted or forwarded to the server 244. In some cases, the database 232 can temporarily store data from the client device 208. The database 232 can discard or remove data packets from the client device 208 responsive to forwarding the data packets to at least one of the servers 244. The database 232 can store information from devices communicating with the database 232, such as source IP address, destination IP address, size of the message, fields in each message, etc., as allowed by the devices.

The database 232 can include a map storage 236 and an index storage 240. The hash storage 236 can include, store, or maintain one or more hash tables, bit maps, or jump tables. The hash table can include indices, hashes, fingers hash values, server hashes, or hash buckets listing the servers 244 available to service traffic from client devices 208. The bit map can include different levels of tables or indices. Each of the indices at individual levels of the bit map can include bit values associated with indices at the previous or lower level. The hash storage 236 can store the hash table and the bit map generated by the map generator 224. The hash storage 236 can be accessed by the map generator 224 for modifying or updating the indices within the hash table and the bit map. The map storage 236 can be accessed by the index selector 228 to select an index of a server 244 to handle the client request. The map storage 236 can store other information related to the hashes, hash table, bit map, or listing of servers 244, such as one or more parameters of the servers 244 used to generate server hashes. The map storage 236 can store the word size, an indication of the number of levels within the bit map, and the size of the VSHT, among other information. The map storage 236 can store finger hash values for individual servers 244 and bit values associated with the indices of the hash table included in the hash table and the bit map.

The index storage 240 can include, store, or maintain the indices of individual nodes or backend servers 244 selected by the index selector 228. For instance, the index selector 228 can determine or select a server 244 to forward access requests from the client device 208. The index selector 228 can store the indices of servers 244 servicing the respective client devices 208 in the index storage 240. In this case, the index storage 240 can include, store, or maintain a table having the client hash values of client devices 208 and the associated indices of servers 244. Accordingly, when receiving incoming traffic from a client device 208 previously accessed a server 244, the index selector 228 can forward additional traffic from the client device 208 to the server 244 indicated in the index table stored in the index storage 240. Therefore, the index storage 240 can facilitate or maintain communication between client devices 208 and the servers 244.

In some cases, the map storage 236 can store the hash values calculated for the servers 244 and the requests from the client devices 208. Further, the index storage 240 can store indices of the respective servers 244 for constructing the hash table stored in the map storage 236. Therefore, the database 232 can store information discussed herein to perform features and functionalities of PRAC for LB. In some cases, the index storage 240 can store individual bits and indices of the bits selected by the index selector 228 when selecting a server 244.

In some cases, the database 232 can be accessed by the administrator of the device 216 to configure any information within the database 232, such as adding or removing servers 244 from the list of servers 244. The administrator can configure other criteria stored in the database 232, such as the configured parameters used as inputs for the server hash function SHF, configured parameters for computing the client hash value, one or more prime numbers used to shuffle the indices, number of fingers, or among other configurable information.

Hence, the process of generating and executing the hybrid hash algorithm can include, for example, the device 216 generating a hash table including indices of servers 244 and a bit map including indices of bit values associated with the respective servers 244. Further, the device 216 can execute the hybrid hash algorithm to select one of the servers 244 listed in the hash table by identifying a non-zero index at the highest level of the bit map and mapping from the index at the highest level to the associated index at the lowest level. Accordingly, the device 216 can select the server 244 to service the request from the client device 208. Thus, by leveraging hybrid hash algorithm to distribute traffic and loads from clients to servers 244, the device 216 can improve the uniformity of load distribution across backend servers 244, improve resiliency to network failures, minimize lookup time or the time to take an LB decision, improve CPU performance to a constant time of $O(\log_w \text{HTS})$ with full consistency, and reduce resource consumption, such as from not having to regenerate the lookup table when a server 244 goes down.

Figure 3A:
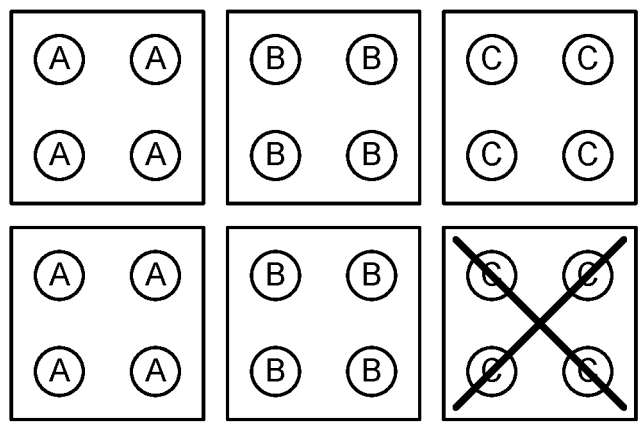
FIGS. 3A-B are example illustrations of distribution of items into buckets, in accordance with an embodiment.
Figure 3B:
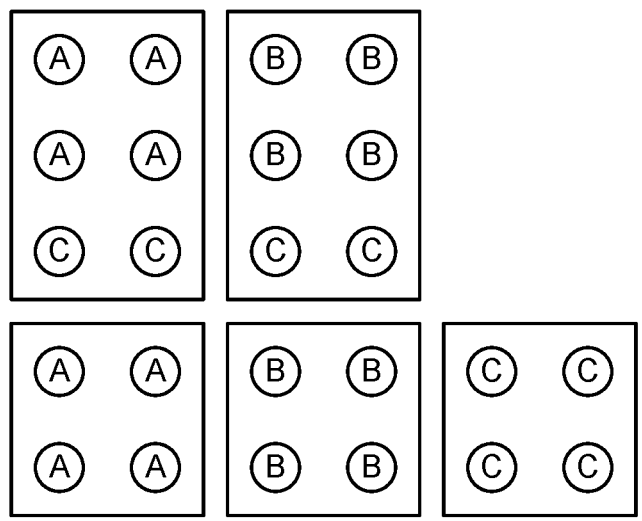

Referring now to FIGS. 3A-B, example illustrations 300A-B of distribution of items into buckets are shown, in accordance with an embodiment. The example features and functionalities described herein can be executed, performed, or otherwise carried out by one or more components of the system 200 (e.g., client device(s) 208, device 216, or servers 244), the computer 100, or any other computing devices described herein in conjunction with FIG. 1A-B and FIG. 2. The illustrations 300A-B can include buckets (e.g., servers 244) serving a number of items representing loads, requests, data packets, or traffic from various client devices 208. The illustrations 300A-B can be used as an example to describe a scenario where the device 216 can provide good distribution and consistency.

In further detail, FIG. 3A illustrates an example illustration 300A with size buckets. In this example, the individual buckets can service, handle, or attend to four items. Since the items are evenly distributed across all buckets, the device 216 can provide a good distribution of m items in n buckets. In example illustration 300A, the m can include 24 items across a total of 6 buckets. Since all buckets are serving the same number of items, the device 216 can provide good distribution in this example (e.g., 100% evenness). The evenness can be calculated by determining the standard deviation of the number of items in each bucket compared to how many items should be in each bucket based on dividing n by m. In this case, dividing n by m can result in an average of how many items should be in each bucket. With server flaps, a bucket or a server 244 can go down or become unavailable, such as illustrated in illustration 300A having an "X" representing a removal of the bucket index from consideration in the subset.

To maintain good consistency, FIG. 3B illustrates an example illustration 300B of the movement of items "C" when a server 244 goes down. If there are m items placed in n buckets, by removing a bucket, items within the removed buckets may be transferred to other buckets (e.g., n−1 amount of buckets). In this case, no other items should move from servers 244 unaffected by the server flaps. Further, if the removed or downed bucket is brought back, only items previously moved from the removed bucket can be moved to the added bucket. Hence, no other items should move to the added bucket or other buckets. With the item movements in the example illustration 300B, the device 216 can provide consistency in load balancing of the items. Accordingly, illustrations 300A-B can present example movements of items (e.g., traffic) from one bucket to one or more other buckets as a result of a server flap.

Figure 4:
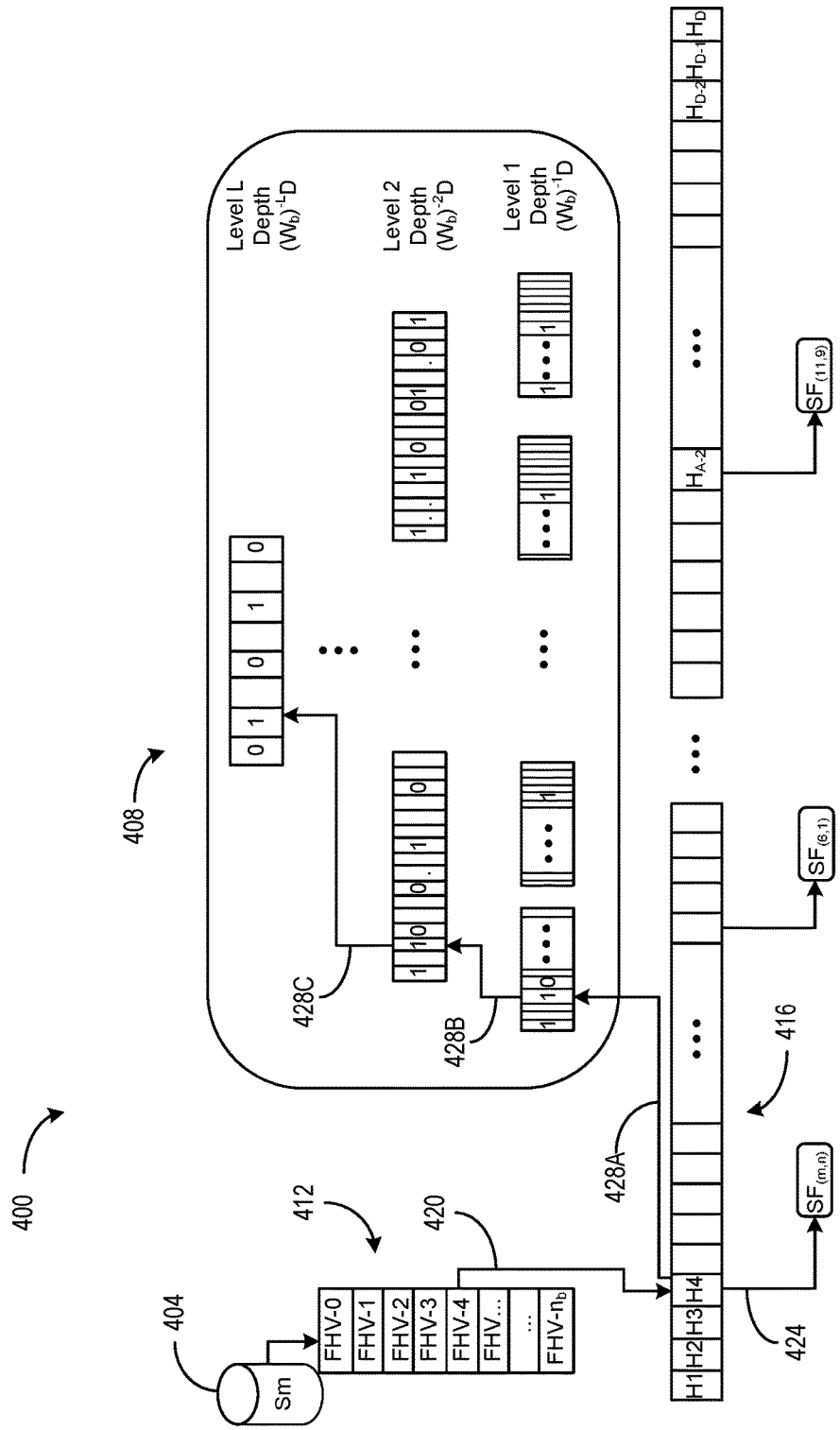
FIG. 4 is an example diagram of a bit map with multiple levels, in accordance with an embodiment.

Referring now to FIG. 4, depicted is an example diagram 400 of a bit map with multiple levels, in accordance with an embodiment. The method or process discussed in example diagram 400 can be executed, performed, or otherwise carried out by one or more components of the system 200 (e.g., client devices 208, device 216, or servers 244), the computer 100, or any other computing devices described herein in conjunction with FIGS. 1A-B. The diagram 400 can include a server 404 (e.g., similar to server 244) associated with a list 412 of finger hash values from FHV-0 to FHV-$n_b$. The diagram 400 can include a hash table 416 including indices listing the servers 244 or the finger hash values of the servers 244. The diagram 400 can include a bit map 408 generated by the device 216 based on the hash table 416.

The diagram 400 can illustrate the steps for setting one or more bit values within the bit map. For example, the device 216 can determine that the server 404 is available to service client requests. The device 216 can identify one or more FHVs of the server 404 to set the bit values of the bit map 408, such as FHV-4. The device 216 can determine the VHTI for the FHV using formula (5). In response to determining the VHTI, the device 216 can map the FHV (or the server 404) to the index H4 in this example (420).

To set one or more bit values associated with index, the device 216 can use the function F3 and the Setbti function (424). The device 216 can use the function F3 to determine which index at the next level in the bit map 408 to set the bit. The device 216 can use the Setbit function to set the bit at the determined index at the next level. The device 216 can use the index of the hash table 416 as input into the function F3, where the function Setbit can take the returned index of F3 and the level to set the bit as inputs. For example, with the index in the hash table, the level to set the bit can be level 1.

The device 216 can map the index of the hash table to an index at level 1 within the bit map 408 (428A). The device 216 can set the bit at the index returned by function F3 at the level 1. The device 216 iteratively map the index of the previous level to the next level to set the bit. For example, the device 216 can map the index of level 1 to an index of level 2 (428B). The device 216 can set one of the bits at a bit offset based on the index value at the previous level. The device 216 can set the bits in other levels until the highest level L (428C). Accordingly, the device 216 can construct, generate, or update the bit map based on the server 404 availability.

Further, the diagram 400 can illustrate an example hash table 416 and bit map 408 used to determine which of the servers 244 to service the requests. For example, the device 216 can determine a client hash value based on a portion of the client request. The device 216 can determine an index in the hash table based on the client hash value. The device 216 can iteratively map from the index of the hash table 416 to an index at the highest level of the bit map 408 (e.g., steps 428A-C). The device 216 can determine a non-zero index within the indices at the highest level (e.g., search through in a clockwise direction or from left to right). With the non-zero index, the device 216 can determine the least significant bit that is non-zero, indicating that at least one server 404 is available to service the request. Accordingly, the device 216 can iteratively map the bit at the highest level to an index at the lowest level or the hash table 416. In response to determining the index of the lowest level corresponding to the index of the hash table 416, the device 216 can obtain, determine, or select the server 404 to service the request from the client device 208.

Figure 5:
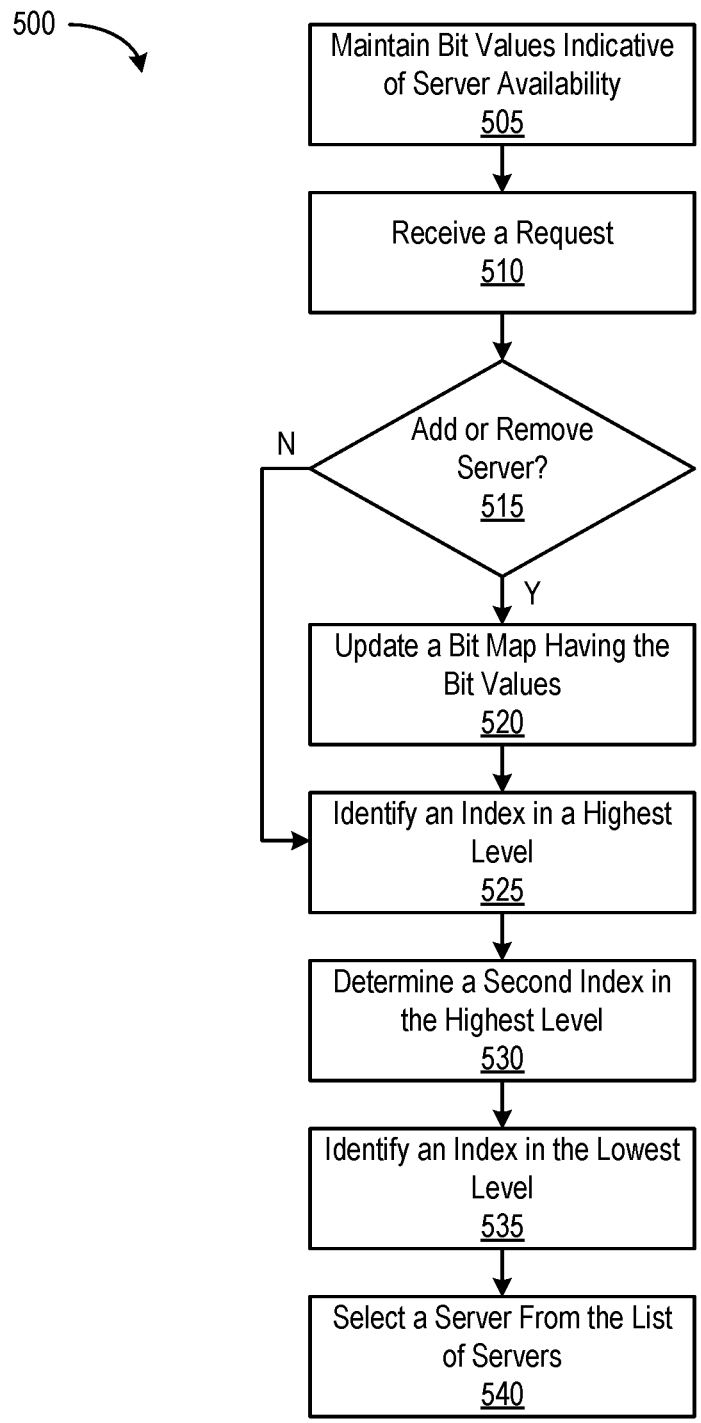
FIG. 5 is a flow diagram of a method for improving load balancing, distribution, and consistency to nodes of a computing environment, in accordance with an embodiment.

Referring to FIG. 5, depicted is a flow diagram of a method for improving load balancing, distribution, and consistency to nodes of a computing environment, in accordance with an embodiment. The example method 500 can be executed, performed, or otherwise carried out by one or more components of the system 200 (e.g., client devices 208, device 216, or servers 244), the computer 100, or any other computing devices described herein in conjunction with FIGS. 1A-B. The method 500 can include a device (e.g., a device intermediary to client devices and servers) maintaining bit values indicative of server availability (505). The device can receive a request from a client device (510). The device can whether to add or remove a server (515). The device can update a bit map having the bit values (520). The device can identify an index in a highest level (525). The device can determine a second index in the highest level (530). The device can identify an index in the lowest level (535). The device can select a server from the list of servers (540).

In further detail, the device can maintain bit values indicative of server availability stored in indices arranged in various levels (505). The device can maintain the indices arranged in various levels in a bit map. The device can generate or construct the bit map based on a hash table including indices storing one or more servers. The individual indices can include at least one server or a list of servers. The device can monitor the status of each server to determine the availability for serving client requests. The device can monitor the status of each server to determine if the server is down or back up to service traffic.

The device can generate the hash table with various indices by determining hash values for individual fingers of a server and computing the index for each of the finger hash values. The hash table can include indices storing the servers associated with the respective finger hash values. For example, the individual indices can correspond to lists of servers, such as at least one server or multiple servers within a single index. The device can form the hash table from multiple hashes (e.g., finger hash values) of individual servers.

The servers can be repeated multiple times based on the number of fingers configured by the administrator of the device. For example, the device can compute multiple finger hash values for each server based on the number of fingers or iterations. The device can store the fingers of the respective server in one or more indices within the hash table. For example, the device can store the fingers of the respective server in one of the indices of the hash table. In another example, the device can store the fingers of the respective server in multiple indices of the hash table.

The device can map indices of the hash table to a level of the bit map, such as the lowest level of the bit map. For example, the device can map each index of the hash table to an index of a first level of the bit map. In this case, the indices of the lowest level can correspond to the indices of the hash table. In another example, the device can map multiple indices of the hash table to each index of the lowest level of the bit map. The number of indices mapped from the hash table can be based on or equal to the word size of each index of the bit map. In this case, the indices of the lowest level can correspond to multiple indices of the hash table.

The number of levels constructed for the bit map can be based on the size of the hash table and the size of individual words within the respective indices. The word size can be based on the number of bits stored in each index of the bit map. For example, the device can determine to construct how many levels to include in a bit map by computing the $\log_w(HTS)$, where w denotes the word size and the HTS denotes the hash table size. The result returned by calculating the number of levels within the bit map can be rounded to the nearest whole number.

The device can map indices from the lowest level to the highest level in the bit map. For example, the device can map the indices from a first level in a bit map to an index of a second level in the bit map. The number of indices mapped from the first level to the second level can be based on the word size (e.g., the number of bits in each index). In further example, if the word size is 32 bits, the device can map a first set of 32 indices from a first level to a first index in a second level. Subsequently, the device can map a second set of 32 indices from the first level to a second index in the second level, and so forth. Hence, each index in a higher level in the various levels of the bit map can be mapped to a set of indices in a lower level of the bit map.

The device can set the bits of the indices in the bit map based on the availability of the servers in the hash table. For example, responsive to the device inserting the servers in the respective indices of the hash table, the device can determine one or more servers available to handle client requests. The device can set the bits in various levels of the bit map based on the server being available. The device can use various functions discussed herein to set one or more bits in each level of the bit map. For example, the device can use a Setbit function and F3 function to set the bit in subsequent levels based on the index at the previous level. The device can input an index at a lower level (e.g., an index in the hash table, an index in level 1, etc.) into F3 to return a corresponding index at a higher level (e.g., a level subsequent, above, or next to the lower level). Further, the device can determine the bit offset that should be set within the index at the higher level. Accordingly, the device can use the Setbit function to set the bit at the respective bit position (or bit offset) of an index at a higher level. If the lower level is represented as l−1, the higher level can be represented as l. Otherwise, the lower level is represented as l, the higher level can be represented as l+1.

The device can propagate setting bits in subsequent levels using similar methods. For example, the device can determine that a bit of a lower level is set. Responsive to setting the bit in the lower level, the device can identify the index of the bit set in the lower level and set a bit of an index at an offset in a higher level.

In some cases, the device can reset the bits of the indices in the bit map based on at least one server becoming unavailable or not ready to handle client requests. The device can perform similar methods for resetting the bits as setting the bits. For example, responsive to a server becoming unavailable, the device can reset a bit or an index in a first level. The device can map the bit in the first level to one of the bits of an index in a second level based on an index and an offset returned by function F3. Responsive to determining the bit position of an index in the second level, the device can determine to reset the bit. The device can determine whether all of the bits stored in the index at the second level are zero. If at least one bit of the index at the second is non-zero, the device may not reset any bit in subsequent levels. Otherwise, if all the bits are zero, the device can determine a bit position of an index in a third level corresponding to the index at the second level to reset, as in this example. The device can reset one or more bits in subsequent levels using similar methods.

At step 510, the device can receive a request from a client of various clients to access one of the servers. The device can be an intermediary between the clients (sometimes referred to as client device(s)) and the servers (sometimes referred to as computing node(s) or backend server endpoint(s)). The request can include, be, or be a part of a data packet or a message transmitted from the client device. The device can intercept the data packet transmitted from the client device to a remote device. In some cases, the device can receive the data packet directly from the client device. The request from the client can include information associated with the client device and the content of the request. For example, the request can include at least an IP address of the client device and a URL to access resources from a remote device. The IP address can include at least one of the source IP address or the destination IP address. The URL can include at least a protocol, domain, and path of the request. The request can include other data discussed herein. The device can receive the request to perform features or functionalities discussed herein for load balancing ("LB") by selecting one of the servers to service, handle, or otherwise respond to the request from the client.

At step 515, the device can whether to add or remove a server. Adding or removing the server can refer to setting or resetting bits of the bit map. For example, the device can determine whether one or more servers in the hash table are added or removed or becomes available or unavailable. The device can proceed to step 520 to update the bit values in the bit map in response to at least one change in the availability of one of the servers. Otherwise, if the bit values are up-to-date or no changes in the availability of the servers, the device can proceed to step 525 to identify an index at the highest level as part of the hybrid hash algorithm for selecting a server to service the client request.

In some cases, the device can regenerate or reconstruct the hash table or the bit map at a predetermined update cycle. For example, the device can be configured with a predetermined update cycle, such as every week, month, quarter, year, etc. Responsive to the predetermined update cycle, the device can reconstruct the hash table or the bit map based on the server availabilities or existing servers in the computing environment. In some other cases, the device can reconstruct the hash table or the bit map in response to receiving instructions from the administrator of the device commanding to update, reinitiate, or regenerate the hash table or the bit map.

At step 520, the device can update a bit map having the bit values. For example, the device can update the bit values stored in the indices in various levels responsive to a change in the availability of any server. For example, if a server is added or becomes available, the device can calculate the finger hash value of the added server. The device can determine an index associated with the finger hash value. Responsive to determining the index, the device can store the added server in the index based on the finger hash value calculated based on a portion of the server information (e.g., IP address and Port of the server). Based on the index of the hash table, the device can set the respective bits in one or more indices of subsequent levels in the bit map. In some cases, if a bit value in a higher level has already been set, the device may skip setting the bit values in subsequent levels. Setting the bit values can refer to changing the bit value to or maintaining the bit value at a non-zero value based on at least one server associated with the indices being ready to service the requests from one or more clients.

In another example, if none of the servers associated with an index of the hash table is ready to service requests from clients, the device can reset the bit values of one or more indices of the bit map. Resetting the bit values can refer to setting the bit value to or maintaining the bit value at zero. For example, the device can determine that all of the servers in a first index of the hash table are no longer available to service the clients. The device can identify a second index in the lowest level of the bit map associated with the first index. The device can reset the bit of the second index in response to determining that none of the servers are available. The device can determine a bit position of indices in subsequent levels to reset based on the servers being unavailable. Accordingly, the device can update bit values, indices, or the bit map based on the changes in the availability of the servers.

The device can determine a hash value (e.g., client hash value) for the request from the client. The device can determine the client hash value in response to receiving the request from the client. In some cases, the device can determine the client hash value in response to updating the bit map. The device can determine the hash value based on at least a portion of the request. For example, the portion of the request from the client can include a URL and an IP address. The device can apply a hash function to the portion of the request to determine a client hash value. In some cases, the device can use other portions of the request or values (e.g., a prime number) to compute the client hash value.

The client device can map the client hash value to one of the indices of the hash table. For example, the device can determine a finger hash value corresponding to the client hash value. In another example, the device can determine or compute an index corresponding to the client hash value. The device can determine the index similar to determining an index for the finger hash value, such as using formula (5). The device can map the index associated with the client hash value to an index at the lowest level or level 1 of the bit map.

The device can iteratively map from the index in the lowest level to an index at the highest level. For example, the device can construct a bit map including three levels. In response to determining a first index in level 1, the device can map the first index to a bit value stored in a second index in level 2. Subsequently, the device can map the second index to a bit value stored in a third index in level 3. Accordingly, the device can iteratively map from an index in the lowest level to an index in the highest level.

At step 525, the device can identify an index in a highest level of various levels in the bit map. The device can identify the index based on at least the portion of the request used to determine the client hash value associated with the index in the lowest level of the bit map. Hence, the device can identify the index of the various indices in the highest level by mapping from the index in the lowest level. The device can proceed to determine a second or another index in the highest level for selecting one of the servers, such as at step 530. In some cases, the device can use the identified index associated with the index in the lowest level associated with the client hash value for selecting one of the servers. For example, the device can determine or identify a bit in the index for iteratively map from the index at the highest level to an index at the lowest level for selecting one of the servers.

At step 530, the device can determine a second index in the highest level. The device can determine the second index that is subsequent to a first index in the highest level. The first index can refer to the index map from the index at the lowest level determined based on the client has value. The device can determine the second index in the highest level that has a bit value that indicates one or more servers associated with the second index is available to service the request.

For example, the device can proceed in a circular clockwise direction from the first index in the highest level identified based on at least the portion of the request from the client to another index (e.g., the second index) in the highest level with a non-zero bit value. In this example, the device can perform a lookup in indices in the highest level in the circular clockwise direction, from left to right, or from up to down. In some cases, the device can proceed to find the second index in the highest level by other methods, such as proceeding in the opposite direction (e.g., circular counter-clockwise direction), perform prime number shuffling, or using a hash value to select a non-zero index at the highest level, for example.

The device can iteratively map from the second index in the highest level to an index of various indices in the lowest level. The device can determine a bit stored in an index in a higher level that indicates the one or more servers are available. The device can map from the non-zero bit in the higher level to an index in a lower level. The device can iterate this process to identify an index in the lowest level of the bit map. For example, the device can identify a least significant bit of the second index in the highest level having a bit value that indicates the one or more servers are available (e.g., a non-zero bit value). The device can map the least significant bit to an index in a lower level. The device can repeat this process to iteratively map from the least significant bit of an index in a higher level to the corresponding index in a lower level. In some cases, the device can identify other non-zero bits to map to an index in the lowest level, such as the most significant non-zero bit, or the second least significant non-zero bit, among others.

At step 535, the device can identify an index in the lowest level that maps to the second index in the highest level. The index in the lowest level can include a non-zero bit value indicative of at least one server being available to service the client request. The device can map the index in the lowest level of the bit map to an index in the hash table. In some cases, if the index in the lowest level includes multiple bits, the device can identify a bit offset of the index in the lowest level having the bit value indicative of at least one available server. The bit offset can be a second least significant bit, a second most significant bit, or other bit positions, such as similar to the bit position used for mapping from the second index in the highest level to the index in the lowest level.

At step 540, the device can select a server from the list of servers corresponding to the index in the lowest level. The index in the lowest level can be mapped from the second index in the highest level. For example, the list of servers can be stored in an index of a hash table associated with the index in the lowest level. In further example, the index of the hash table can include an available server corresponding to the index in the lowest level. In this example, the device can select the server stored in the index to service the client request. In another example, the index of the hash table can include a list of servers corresponding to the index in the lowest level. The device can select one of the servers from the list of servers by determining a server having the least loads within the list of servers. The device can select one of the servers from the list of servers using any type of algorithms. For example, the device can perform random selection using a random number generator, round-robin, or location-based selection (e.g., distance or latency to the server). In another example, the device can determine the number of active sessions in the one or more servers of the list of servers to select the server with the least number of active sessions. In further example, the device can determine the capacity of individual servers comparative to the load or sessions active for the respective server to determine which to select. Hence, the device can execute the findBestBackend function with the index of the hash table as the input to return one of the servers at the index, where the findBest-Backend function can include any algorithms for server selection.

In some cases, the index in the lowest level can include multiple bits having bit values indicative of the server availabilities. In this case, each bit offset can represent a server within the list of servers of an index in the hash table. The device can select the server based on a bit having a non-zero value. For example, the device can select the least significant bit having a non-zero value representing a server in the list of servers. In other examples, the device can select the most significant bit, among other bit positions to select the server to service the request. Accordingly, the device can select the server to handle the traffic from the client device.

In some cases, the word size for each level can be different. For example, the word size for individual indices in the highest level can be greater than the word size for indices in lower levels. The number of indices can be less from lower levels to higher levels. For example, if the hash table size is 128 indices and the word size is 16 bits, the device can construct a bit map with two levels. The device can construct the bit map with 128 indices in a first level and 8 indices in the second level. Individual indices in the second level can include 16 bits corresponding to 16 indices in the first level, for example. In some cases, the device can generate multiple hash tables to store the servers. In this case, the device can generate or construct multiple bit maps associated with the respective hash tables.

Further Example Embodiments

The following examples pertain to further embodiments, from which numerous permutations and configurations will be apparent.

Example 1 includes a method including: maintaining, by a device intermediary to a plurality of clients and a plurality of servers, bit values indicative of server availability stored in indices arranged in a plurality of levels, wherein a lowest level of the plurality of levels comprises a plurality of indices corresponding to a list of servers repeated multiple times, and each index in a higher level in the plurality of levels maps to a set of indices in a lower level of the plurality of levels; receiving, by the device, a request from a client of the plurality of clients to access one of the plurality of servers; identifying, by the device based on at least a portion of the request, an index of a plurality of indices in a highest level of the plurality of levels; determining, by the device, a second index in the plurality of indices in the highest level that is subsequent to the index in the highest level and has a bit value that indicates one or more servers associated with the second index is available to service the request; identifying, by the device, an index of the plurality of indices in the lowest level of the plurality of levels that maps to the second index in the highest level; and selecting, by the device to service the request, a server from the list of servers corresponding to the index in the lowest level.

Example 2 includes the subject matter of Example 1, further comprising: determining, by the device based on at least the portion of the request, a second index of the plurality of indices in the lowest level; and identifying, by the device, the index of the plurality of indices in the highest level of the plurality of levels that maps to the second index in the lowest level.

Example 3 includes the subject matter of any one of Examples 1 and 2, further comprising: determining, by the device, a hash value based on the at least the portion of the request received from the client; identifying, by the device using the hash value, a second index of the plurality of indices in the lowest level; and iteratively mapping, by the device, the second index in the lowest level to the index in the highest level of the plurality of indices in the highest level.

Example 4 includes the subject matter of any one of Examples 1 through 3, further comprising iteratively mapping, by the device, the second index from the highest level to the index of the plurality of indices in the lowest level with the bit value that indicates the one or more servers are available.

Example 5 includes the subject matter of any one of Examples 1 through 4, further comprising: identifying, by the device, a least significant bit of the second index in the plurality of indices in the highest level, the least significant bit having the bit value that indicates the one or more servers are available; mapping, by the device, the least significant bit to the index of the plurality of indices in the lowest level;

identifying, by the device, a second least significant bit of the index in the plurality of indices in the lowest level, the second least significant bit having the bit value indicative of an available server; and selecting, by the device to service the request, the server from the list of servers corresponding to the second least significant bit of the index in the lowest level.

Example 6 includes the subject matter of any one of Examples 1 through 5, further comprising generating, by the device, a hash table with a plurality of indices that each correspond to lists of servers formed from multiple hashes of each of the plurality of servers, wherein the indices of the lowest level of the plurality of levels correspond to the plurality of indices in the hash table.

Example 7 includes the subject matter of any one of Examples 1 through 6, further comprising: setting, by the device, bit values of first indices in the plurality of levels to a non-zero value based on at least one server associated with the indices being ready to service requests from the plurality of clients; and setting, by the device, bit values of second indices in the plurality of levels to zero based on none of the servers associated with the second indices being ready to service requests from the plurality of clients.

Example 8 includes the subject matter of any one of Examples 1 through 7, further comprising identifying, by the device, the second index in the highest level by proceeding in a circular clockwise direction from the index in the highest level identified based on at least a portion of the request from the client.

Example 9 includes the subject matter of any one of Examples 1 through 8, further comprising updating, by the device, the bit values stored in the indices in the plurality of levels responsive to a change in availability of any server of the plurality of servers.

Example 10 includes a system including: a device comprising one or more processors and memory that is intermediary to a plurality of clients and a plurality of servers to: maintain bit values indicative of server availability stored in indices arranged in a plurality of levels, wherein a lowest level of the plurality of levels comprises a plurality of indices corresponding to a list of servers repeated multiple times, and each index in a higher level in the plurality of levels maps to a set of indices in a lower level of the plurality of levels; receive a request from a client of the plurality of clients to access one of the plurality of servers; identify, based on at least a portion of the request, an index of a plurality of indices in a highest level of the plurality of levels; determine a second index in the plurality of indices in the highest level that is subsequent to the index in the highest level and has a bit value that indicates one or more servers associated with the second index is available to service the request; identify an index of the plurality of indices in the lowest level of the plurality of levels that maps to the second index in the highest level; and select, to service the request, a server from the list of servers corresponding to the index in the lowest level.

Example 11 includes the subject matter of Example 10, wherein the device is further configured to: determine, based on at least the portion of the request, a second index of the plurality of indices in the lowest level; and identify the index of the plurality of indices in the highest level of the plurality of levels that maps to the second index in the lowest level.

Example 12 includes the subject matter of any one of Examples 10 and 11, wherein the device is further configured to: determine a hash value based on the at least the portion of the request received from the client; identify, using the hash value, a second index of the plurality of indices in the lowest level; and iteratively map the second index in the lowest level to the index in the highest level of the plurality of indices in the highest level.

Example 13 includes the subject matter of any one of Examples 10 through 12, wherein the device is further configured to iteratively map the second index from the highest level to the index of the plurality of indices in the lowest level with the bit value that indicates the one or more servers are available.

Example 14 includes the subject matter of any one of Examples 10 through 13, wherein the device is further configured to: identify a least significant bit of the second index in the plurality of indices in the highest level, the least significant bit having the bit value that indicates the one or more servers are available; map the least significant bit to the index of the plurality of indices in the lowest level; identify a second least significant bit of the index in the plurality of indices in the lowest level, the second least significant bit having the bit value indicative of an available server; and select, to service the request, the server from the list of servers corresponding to the second least significant bit of the index in the lowest level.

Example 15 includes the subject matter of any one of Examples 10 through 14, wherein the device is further configured to generate a hash table with a plurality of indices that each correspond to lists of servers formed from multiple hashes of each of the plurality of servers, wherein the indices of the lowest level of the plurality of levels correspond to the plurality of indices in the hash table.

Example 16 includes the subject matter of any one of Examples 10 through 15, wherein the device is further configured to: set bit values of first indices in the plurality of levels to a non-zero value based on at least one server associated with the indices being ready to service requests from the plurality of clients; and set bit values of second indices in the plurality of levels to zero based on none of the servers associated with the second indices being ready to service requests from the plurality of clients.

Example 17 includes the subject matter of any one of Examples 10 through 16, wherein the device is further configured to identify the second index in the highest level by proceeding in a circular clockwise direction from the index in the highest level identified based on at least the portion of the request from the client.

Example 18 includes a non-transitory computer readable storage medium storing instructions that, when executed by one or more processors, cause the one or more processors to: maintain bit values indicative of server availability stored in indices arranged in a plurality of levels, wherein a lowest level of the plurality of levels comprises a plurality of indices corresponding to a list of servers repeated multiple times, and each index in a higher level in the plurality of levels maps to a set of indices in a lower level of the plurality of levels; receive request from a client to access one of a plurality of servers; identify, based on at least a portion of the request, an index of a plurality of indices in a highest level of the plurality of levels; determine a second index in the plurality of indices in the highest level that is subsequent to the index in the highest level and has a bit value that indicates one or more servers associated with the second index is available to service the request; identify an index of the plurality of indices in the lowest level of the plurality of levels that maps to the second index in the highest level; and select, to service the request, a server from the list of servers corresponding to the index in the lowest level.

Example 19 includes the subject matter of Example 18, wherein the instructions further comprise instructions to:

determine, based on at least the portion of the request, a second index of the plurality of indices in the lowest level; and identify the index of a plurality of indices in the highest level of the plurality of levels that maps to the second index in the lowest level.

Example 20 includes the subject matter of any one of Examples 19 and 20, wherein the instructions further comprise instructions to: determine a hash value based on the at least the portion of the request received from the client; identify, using the hash value, a second index of the plurality of indices in the lowest level; and iteratively map the second index in the lowest level to the index in the highest level of the plurality of indices in the highest level.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method, comprising:
   maintaining, by a device intermediary to a plurality of clients and a plurality of servers, bit values indicative of server availability stored in indices arranged in a plurality of levels, wherein a lowest level of the plurality of levels comprises a plurality of indices corresponding to a list of servers repeated multiple times, and each index in a higher level in the plurality of levels maps to a set of indices in a lower level of the plurality of levels;
   receiving, by the device, a request from a client of the plurality of clients to access one of the plurality of servers;
   identifying, by the device based on at least a portion of the request, an index of a plurality of indices in a highest level of the plurality of levels;
   determining, by the device, a second index in the plurality of indices in the highest level that is subsequent to the index in the highest level and has a bit value that indicates one or more servers associated with the second index is available to service the request;
   identifying, by the device, an index of the plurality of indices in the lowest level of the plurality of levels that maps to the second index in the highest level; and
   selecting, by the device to service the request, a server from the list of servers corresponding to the index in the lowest level.

2. The method of claim 1, further comprising:
   determining, by the device based on at least the portion of the request, a second index of the plurality of indices in the lowest level; and
   identifying, by the device, the index of the plurality of indices in the highest level of the plurality of levels that maps to the second index in the lowest level.

3. The method of claim 1, further comprising:
   determining, by the device, a hash value based on the at least the portion of the request received from the client;
   identifying, by the device using the hash value, a second index of the plurality of indices in the lowest level; and
   iteratively mapping, by the device, the second index in the lowest level to the index in the highest level of the plurality of indices in the highest level.

4. The method of claim 1, further comprising iteratively mapping, by the device, the second index from the highest level to the index of the plurality of indices in the lowest level with the bit value that indicates the one or more servers are available.

5. The method of claim 1, further comprising:
   identifying, by the device, a least significant bit of the second index in the plurality of indices in the highest level, the least significant bit having the bit value that indicates the one or more servers are available;
   mapping, by the device, the least significant bit to the index of the plurality of indices in the lowest level;
   identifying, by the device, a second least significant bit of the index in the plurality of indices in the lowest level, the second least significant bit having the bit value indicative of an available server; and
   selecting, by the device to service the request, the server from the list of servers corresponding to the second least significant bit of the index in the lowest level.

6. The method of claim 1, further comprising generating, by the device, a hash table with a plurality of indices that each correspond to lists of servers formed from multiple hashes of each of the plurality of servers, wherein the indices of the lowest level of the plurality of levels correspond to the plurality of indices in the hash table.

7. The method of claim 1, further comprising:
setting, by the device, bit values of first indices in the plurality of levels to a non-zero value based on at least one server associated with the indices being ready to service requests from the plurality of clients; and
setting, by the device, bit values of second indices in the plurality of levels to zero based on none of the servers associated with the second indices being ready to service requests from the plurality of clients.

8. The method of claim 1, further comprising identifying, by the device, the second index in the highest level by proceeding in a circular clockwise direction from the index in the highest level identified based on at least a portion of the request from the client.

9. The method of claim 1, further comprising updating, by the device, the bit values stored in the indices in the plurality of levels responsive to a change in availability of any server of the plurality of servers.

10. A system, comprising:
a device comprising one or more processors and memory that is intermediary to a plurality of clients and a plurality of servers to:
maintain bit values indicative of server availability stored in indices arranged in a plurality of levels, wherein a lowest level of the plurality of levels comprises a plurality of indices corresponding to a list of servers repeated multiple times, and each index in a higher level in the plurality of levels maps to a set of indices in a lower level of the plurality of levels;
receive a request from a client of the plurality of clients to access one of the plurality of servers;
identify, based on at least a portion of the request, an index of a plurality of indices in a highest level of the plurality of levels;
determine a second index in the plurality of indices in the highest level that is subsequent to the index in the highest level and has a bit value that indicates one or more servers associated with the second index is available to service the request;
identify an index of the plurality of indices in the lowest level of the plurality of levels that maps to the second index in the highest level; and
select, to service the request, a server from the list of servers corresponding to the index in the lowest level.

11. The system of claim 10, wherein the device is further configured to:
determine, based on at least the portion of the request, a second index of the plurality of indices in the lowest level; and
identify the index of the plurality of indices in the highest level of the plurality of levels that maps to the second index in the lowest level.

12. The system of claim 10, wherein the device is further configured to:
determine a hash value based on the at least the portion of the request received from the client;
identify, using the hash value, a second index of the plurality of indices in the lowest level; and
iteratively map the second index in the lowest level to the index in the highest level of the plurality of indices in the highest level.

13. The system of claim 10, wherein the device is further configured to iteratively map the second index from the highest level to the index of the plurality of indices in the lowest level with the bit value that indicates the one or more servers are available.

14. The system of claim 10, wherein the device is further configured to:
identify a least significant bit of the second index in the plurality of indices in the highest level, the least significant bit having the bit value that indicates the one or more servers are available;
map the least significant bit to the index of the plurality of indices in the lowest level;
identify a second least significant bit of the index in the plurality of indices in the lowest level, the second least significant bit having the bit value indicative of an available server; and
select, to service the request, the server from the list of servers corresponding to the second least significant bit of the index in the lowest level.

15. The system of claim 10, wherein the device is further configured to generate a hash table with a plurality of indices that each correspond to lists of servers formed from multiple hashes of each of the plurality of servers, wherein the indices of the lowest level of the plurality of levels correspond to the plurality of indices in the hash table.

16. The system of claim 10, wherein the device is further configured to:
set bit values of first indices in the plurality of levels to a non-zero value based on at least one server associated with the indices being ready to service requests from the plurality of clients; and
set bit values of second indices in the plurality of levels to zero based on none of the servers associated with the second indices being ready to service requests from the plurality of clients.

17. The system of claim 10, wherein the device is further configured to identify the second index in the highest level by proceeding in a circular clockwise direction from the index in the highest level identified based on at least the portion of the request from the client.

18. A non-transitory computer readable storage medium storing instructions that, when executed by one or more processors, cause the one or more processors to:
maintain bit values indicative of server availability stored in indices arranged in a plurality of levels, wherein a lowest level of the plurality of levels comprises a plurality of indices corresponding to a list of servers repeated multiple times, and each index in a higher level in the plurality of levels maps to a set of indices in a lower level of the plurality of levels;
receive request from a client to access one of a plurality of servers;
identify, based on at least a portion of the request, an index of a plurality of indices in a highest level of the plurality of levels;
determine a second index in the plurality of indices in the highest level that is subsequent to the index in the highest level and has a bit value that indicates one or more servers associated with the second index is available to service the request;
identify an index of the plurality of indices in the lowest level of the plurality of levels that maps to the second index in the highest level; and
select, to service the request, a server from the list of servers corresponding to the index in the lowest level.

19. The non-transitory storage medium of claim 18, wherein the instructions further comprise instructions to:
- determine, based on at least the portion of the request, a second index of the plurality of indices in the lowest level; and
- identify the index of a plurality of indices in the highest level of the plurality of levels that maps to the second index in the lowest level.

20. The non-transitory storage medium of claim 18, wherein the instructions further comprise instructions to:
- determine a hash value based on the at least the portion of the request received from the client;
- identify, using the hash value, a second index of the plurality of indices in the lowest level; and
- iteratively map the second index in the lowest level to the index in the highest level of the plurality of indices in the highest level.

* * * * *